United States Patent
Wang et al.

(10) Patent No.: US 11,443,014 B1
(45) Date of Patent: Sep. 13, 2022

(54) SPARSE MATRIX MULTIPLIER IN HARDWARE AND A RECONFIGURABLE DATA PROCESSOR INCLUDING SAME

(71) Applicant: SambaNova Systems, Inc., Palo Alto, CA (US)

(72) Inventors: Mingran Wang, San Jose, CA (US); Raghu Prabhakar, San Jose, CA (US); Darshan Dhimantkumar Gandhi, RoundRock, TX (US); Maulik Subhash Desai, Cedar Park, TX (US); Nathan Francis Sheeley, Austin, TX (US); Scott Layson Burson, Sunnyvale, CA (US); Sitanshu Gupta, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 17/520,290

(22) Filed: Nov. 5, 2021

Related U.S. Application Data

(60) Provisional application No. 63/236,214, filed on Aug. 23, 2021.

(51) Int. Cl.
*G06F 17/16* (2006.01)

(52) U.S. Cl.
CPC .................... *G06F 17/16* (2013.01)

(58) Field of Classification Search
CPC ...... G06F 12/0207; G06F 17/16; G06F 16/22; G06F 16/2228–2237
See application file for complete search history.

(56) References Cited

U.S. PATENT DOCUMENTS

| | | | |
|---|---|---|---|
| 2019/0042542 A1* | 2/2019 | Narayanamoorthy | G06F 9/3016 |
| 2019/0266217 A1* | 8/2019 | Arakawa | G06F 7/462 |

FOREIGN PATENT DOCUMENTS

| | | |
|---|---|---|
| WO | 2010142987 A1 | 12/2010 |

OTHER PUBLICATIONS

Podobas et al, A Survey on Coarse-Grained Reconfigurable Architectures From a Performance Perspective, IEEEAccess, vol. 2020.3012084, Jul. 27, 2020, 25 pages.

(Continued)

*Primary Examiner* — Matthew D Sandifer
(74) *Attorney, Agent, or Firm* — Haynes Beffel & Wolfeld LLP; Sikander M. Khan; Bruce A. Young

(57) ABSTRACT

The technology disclosed relates to matrix multiplication where the multiplier can be a sparse matrix. In particular, a multiplication device includes first circuitry configured to obtain the multiplicand matrix and an index of columns of the multiplier matrix and to generate an intermediate matrix that has one row per entry in the index copied from a respective row of the multiplicand matrix based on a value of a corresponding entry in the index. The device also includes second circuitry configured to receive the intermediate matrix from the first circuitry, obtain non-zero values of the multiplier matrix and a list of a number of non-zero entries per row of the multiplier matrix, and generate a product matrix as a result of multiplies of the non-zero values of the multiplier matrix and the intermediate matrix.

30 Claims, 14 Drawing Sheets

(56) References Cited

OTHER PUBLICATIONS

M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
Prabhakar et. al., Plasticine: A Reconfigurable Architecture for Parallel Patterns, ISCA 2017, Jun. 24-28, 2017, Toronto, ON, Canada, 14 pages.
Gondimalla et. al., SparTen: A sparse tensor accelerator for convolutional neural networks, Proceedings of the 52nd Annual IEEE/ACM International Symposium on Microarchitecture, dated Oct. 12-16, 2019, 15 pages.

\* cited by examiner

```
     /* Sparse(n,x) x Dense(x,m) = Product(n,m) with multiplication for all rows
     /*       each row of Sparse has at least one non-zero value
201  k=0;                          /* k will be number of non-zero values in Sparse matrix
202  For i=0 to n-1 {              /* for each row in Sparse
203      nnzs_per_row(i) = 0;
204      For j=0 to x-1 {          /* for each column in Sparse
205          If Sparse(i,j) ≠ 0 {
206              col_indices(k) = j;      /* get column of non-zero values in Sparse
207              values(k) = Sparse(i,j); /* create 1-dim array of non-zero values
208              index_select(k,*) = Dense(j,*);  /* copy full row of Dense
209              k++;
210              nnzs_per_row(i)++;       /* track # of non-zero values
211          }
212      }
213  }
214  p = 0;                        /* used for row index of final Product matrix
215  a = nnzs_per_row(p);          /* start new row accumulation
216  For i=0 to k-1 {              /* for each row of index_select matrix
217      For j=0 to m-1 {          /* for each column of index_select matrix
218          If a = nnzs_per_row(p) {   /* start new row
219              Product(p,j) = values(j) * index_select(i,j);
220          Else                       /* accumulate into row
221              Product(p,j) = values(j) * index_select(i,j) + Product(p,j);
222      }
223  }
224  If a = 1 {                    /* See if done with this Product row
225      p++;                      /* go to next non-zero row
226      a = nnzs_per_row(p);      /* start new row accumulation
227  Else
228      a--;                      /* decrement counter for accumulation into row
229  }
230  }
```

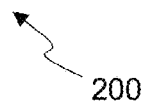

FIG. 2A

```
      /* Sparse(n,x) x Dense(x,m) = Product(n,m) with support for all-zero rows
      /* Sparse (n,x) pre-compressed to col_indices(k), values(k), & nnzs_per_row(n)
241   For i=0 to k-1 {                    /* for each element in col_indices
242       index_select(i,*) = Dense(col_indices(i),*); /* copy full row of Dense into index_select
243   }
244   p = 0;                              /* Index for values and index_select row
245   For i=0 to n-1 {                    /* for each row in Product matrix
246       if nnzs_per_row(i) = 0 {
247           row(*) = 0;
248       Else
249           row(*) = values(p) * index_select(p,*);
250           p++;
251           if nnzs_per_row(i) > 1 {
252               For h=0 to nnzs_per_row(i)-2 {/* Accumulate for a no-zero row of Product
253                   row(*) = values(p) * index_select(p,*) + row(*);
254                   p++;
255               }
256       }
257       Product(i,*) = row(*);           /* Store the accumulated row value int Product
258   }
```

```
     /* Sparse(n,x) x Dense(x,m) = Product(n,m) with skipping all-zero rows
261  k=0;                    /* k will be number of non-zero values in Sparse matrix
262  r=0;                    /* r will be number of non-zero rows in Sparse matrix
263  For i=0 to n-1 {         /* for each row in Sparse
264      nnzs_per_row(r) = 0;
265      For j=0 to x-1 {     /* for each column in Sparse
266          If Sparse(i,j) ≠ 0 {
267              col_indices(k) = j;   /* get column of non-zero values in Sparse
268              values(k) = Sparse(i,j); /* create 1-dim array of non-zero values
269              index_select(k,*) = Dense(j,*);     /* copy full row of Dense
270              k++;
271              nnzs_per_row(r)++;    /* track # of non-zero values in non-zero rows
272          }
273      }
274      If nnzs_per_row(r) ≠ 0 {  /* if there are non-zero values in this row
275          nz_row_num(r) = i;    /* track non-zero row numbers
276          r++;                  /* increment number of non-zero rows found
277      }
278  }
279  Product(*,*) = 0;         /* Initialize full Product matrix to zero
280  p = 0;                    /* used for row index of final Product matrix
281  For i=0 to r-1 {          /* for each row of Sparse with non-zero values
282      For h=0 to nnzs_per_row(i)-1 {  /* for each non-zero value in row
283          Product(nz_row_num(i),*) = values(p) * index_select(p,*) +
284              Product(nz_row_num(i),*); /* accumulate into row
285          p++;              /* go to next non-zero row
286      }
287  }
```

FIG. 2C

```
     /* Sparse(n,x) x Dense(x,m) = Product(n,m) with skipping all-zero rows
     /* Sparse (n,x) provided as col_indices(k), values(k), nnzs_per_row(n) & nz_row_num(r)
291  Product(*,*) = 0;                      /* Initialize full Product matrix to zero
292  p = 0;                                 /* Index into col_indices/values
293  For i=0 to r-1 {                       /* for each row in Sparse having non-zero values
294      For h=0 to nnzs_per_row(i)-1 {     /* Accumulate for a no-zero row of Product
295          Product(nz_row_num(i),*) = values(p) * Dense(col_indices(p),*) +
296              Product(nz_row_num(i),*); /* Accumulate non-zero value * row of Dense
297          p++;                           /* go to next non-zero entry
298      }
299  }
```

SPARSE MATRIX MULTIPLIER IN HARDWARE AND A RECONFIGURABLE DATA PROCESSOR INCLUDING SAME

CROSS-REFERENCE

This application claims the benefit of U.S. Provisional Patent Application No. 63/236,214, entitled, "Sparse Matrix Multiplier," filed on 23 Aug. 2021 which is hereby incorporated by reference herein for all purposes.

BACKGROUND

The present subject matter relates to matrix multiplication by a computer and more specifically to such multiplication where the multiplier is mostly populated with zero values (i.e. the multiplier is a sparse matrix).

Reconfigurable processors, including field programmable gate arrays (FPGAs), can be configured to implement a variety of functions more efficiently or faster than might be achieved using a general-purpose processor executing a computer program. So called Coarse-Grained Reconfigurable Architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

With the rapid expansion of applications that can be characterized by dataflow processing, such as natural-language processing, computer vision, recommendation engines, and scientific computing, the performance and efficiency challenges of traditional instruction set architectures have become apparent. First, the sizable, generation-to-generation performance gains for multicore processors have tapered off. As a result, developers can no longer depend on traditional performance improvements to power more complex and sophisticated applications. This holds true for both CPU fat-core and GPU thin-core architectures. A new approach is required to extract more useful work from current semiconductor technologies.

Amplifying the gap between required and available computing is the explosion in the use of deep learning. According to a study by OpenAI, during the period between 2012 and 2020, the compute power used for notable artificial intelligence achievements has doubled every 3.4 months. It is common for GPUs to be used for training and CPUs to be used for inference in machine learning systems based on their different characteristics. Many real-life systems demonstrate continual and sometimes unpredictable change, which means predictive accuracy of models declines without frequent updates.

Finally, while the performance challenges are acute for machine learning, other workloads such as analytics, scientific applications and even SQL data processing all could benefit from higher performance processing. New approaches should be flexible enough to support broader workloads and facilitate the convergence of machine learning and high-performance computing or machine learning and business applications. As an example, Sparse-Dense Matrix Multiplies are widely used in machine learning and high-performance computing applications. An HPC application such as graph analytics will likely utilize a sparse adjacency matrix and in a machine learning network, the weight for inference will be sparse most of the time. Storing a matrix that is mostly zeros and then performing multiplication on vectors that are all zero is very inefficient.

BRIEF DESCRIPTION OF THE DRAWINGS

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIG. 2A, FIG. 2B, FIG. 2C and FIG. 2D show pseudocode embodiments of a sparse matrix multiply.

DETAILED DESCRIPTION

Figures 1A, 1B:
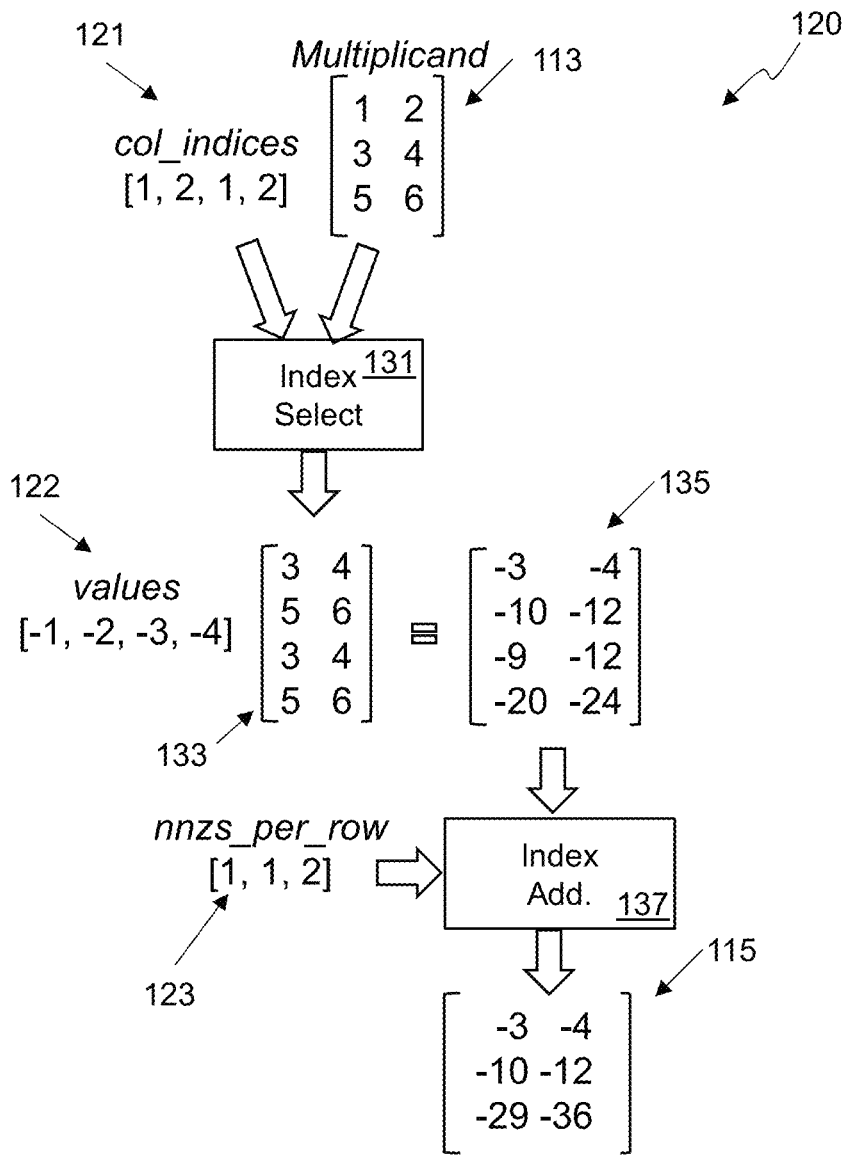
FIG. 1A shows an equation for an example sparse matrix multiply.
FIG. 1B shows a data flow diagram of an embodiment of the sparse matrix multiply shown in FIG. 1A.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Described herein are apparatuses, systems, methods, and computer program products that utilize a method for efficiently performing a matrix multiply on a multiplicand matrix by a multiplier matrix that is mostly populated with zeros, that is to say the multiplier is a sparse matrix. This can be expressed as Equation 1 below:

[multiplier matrix][multiplicand matrix]=[product matrix]    Equation 1:

In some embodiments the matrices are represented as two two-dimensional arrays stored in row-major order. In embodiments where the sparse multiplier matrix is stored as a matrix, circuitry may be included that is configured to process the sparse multiplier matrix to create a col_indices vector (i.e. a one-dimensional array) that has of one entry for each non-zero value in the sparse multiplier matrix that provides the column number of that non-zero entry. The circuit also creates a values vector having the same length as the col_indices vector that provides the non-zero values of the sparse matrix. A nnzs_per_row vector is also created by the circuitry that has one entry per row of the sparse matrix that provides the number of non-zero entries in each row. This is similar to a compressed sparse row (CSR) or Yale format representation of a sparse matrix, although the nnzs_per_row vector is somewhat different than the row_index array (sometimes called the IA vector) of the CSR format. Other representations, such as the CSR format among others, may be used in embodiments as inputs to the index stage and in some embodiments, a sparse matrix may be directly stored in the described format (or some other compressed format) so that no conversion from the two-dimensional array to the described format is required.

If the matrix is received in CSR format consisting of an A vector, a JA vector, and an IA vector, where the A vector may be identical to the values vector and the JA vector may be identical to the col_indices vector, but the IA vector is somewhat different than the nnzs_per_row vector. Some embodiments may utilize the IA vector directly instead of using the nnzs_per_row vector by modifying the algorithms described below somewhat. In other embodiments, however, the IA vector may be converted into the nnzs_per_row vector using the equations below:

For $0 \le i < m-1$: nnzs_per_row$(i)$=$IA(i+1)$−$IA(i)$,
nnzs_per_row$(m-1)$=$NNZ$−$IA(m-1)$;      Equation 2:

where NNZ is the total number of non-zero values, and m is the number of rows in the matrix.

Once the sparse matrix is compressed as described above, the sparse matrix multiply may be divided into three stages, 1) the index stage, 2) the multiply stage and 3) the index add stage. In the index stage, the circuitry forms an index_select matrix with one row for each entry in the col_indices vector, that is one row for each non-zero value in the sparse multiplier matrix. Each row of the index_select matrix contains the same values as the row of the multiplicand matrix indicated by the corresponding entry in the col_indices vector (that is the column of the corresponding non-zero value).

In the multiply stage, the index_select matrix is multiplied by the values vector (as multiplier) to create a partial_products matrix. The rows of the partial_products matrix are then processed using the nnzs_per_row vector to create the product matrix which is the result of the matrix multiplication. This may be referred to as the index add stage. Starting with the first entry of the nnzs_per_row vector, the number of rows of the partial_products matrix indicated by that entry are added by the circuitry to create the first row value of the product matrix. Each entry of the nnzs_per_row vector is used to create an indexed matrix sum of that number of rows in the partial_products matrix to generate a row of the final product matrix. In some embodiments, the multiply stage and the index add stage may be combined into a dynamic multiply accumulate stage and performed by an integrated set of circuitry.

As an alternative embodiment that may be used if the sparse multiplier matrix has many rows with no non-zero entries, the circuitry may be configured to create a nz_row_num vector that provides a row index for each row of the multiplier matrix that has at least one non-zero entry and a nnzs_per_row vector is created with entries for only the rows of the multiplier matrix with at least one non-zero entry. A product matrix is initialized to have all zero values and the nz_row_num matrix can be used to accumulate (using the nnzs_per_row vector) the products of the multiply stage into the proper row of the product matrix to generate the result.

A wide variety of electronic hardware may be used to perform the sparse matrix multiply. In some embodiments, dedicated hardware state machines or a sequencer may obtain the data representing the multiplier and multiplicand over dedicated wires or a bus or by accessing one or more memory devices. The data may then be routed to one or more arithmetic logic units (ALUs), dedicated multipliers and adders, and/or other hardware configured in a flow-through configuration or as one or more pipeline stages to generate results. The results can then be provided on dedicated wires or a bus to other hardware or stored into the same (or different) memory devices from which the matrices were obtained. In some embodiments the hardware may be able to process a full row of multiplicand data at once, but in other embodiments, the hardware may be able to process some subset of columns of data at a time and then sequentially process the subsets of columns to generate the full results. This may be referred to as vector processing where the vector width is the amount of data (i.e. the number of elements of a matrix) that can be simultaneously processed. The hardware may be configured to handle any type of data stored in the matrices, depending on the embodiment, such as, but not limited to, 8, 16, 32, or 64 bit signed or unsigned binary integer data, 16, 32, 64, 128, or 256 bit floating point data in any suitable format, such as Institute of Electrical and Electronic Engineers (IEEE) 754, Brain Floating Point (bfloat16), TensorFloat, MIL-STD 1750A, IBM, or DEC formats, or binary-coded decimal data of any number of decimal digits, such as 8, 16, or 32 digits (32, 64, or 128 bits). Other embodiments may utilize one or more field-programmable gate-arrays (FPGAs), or a Coarse-Grained Reconfigurable Architecture (CGRA) for all or part of the electronic hardware used to implement the sparse matrix multiplier. In embodiments, a packet-switched network may be used to move the data from one compute or memory block to another compute/memory block. Some embodiments may utilize a general-purpose processor running a program (i.e. computer code or instructions) stored in memory as some or all of the hardware used to perform the sparse matrix multiply.

Reference now is made in detail to the examples illustrated in the accompanying drawings and discussed below.

FIG. 1A shows an example equation 110 of a matrix multiply. In this example a 3×3 sparse multiplier matrix 110 is used to multiply a 3×2 dense multiplicand matrix 113 with the result being a 3×2 product matrix 115. The sparse matrix 111 is shown in its array form, but it could be represented in a more compressed format. In some embodiments, the sparse matrix 111 may be represented by three one-dimensional arrays (i.e. vectors). One of the vectors may be an array consisting of a column index for each non-zero entry in the sparse matrix 111, which would be [1, 2, 1, 2] for the example shown in FIG. 1A (with row and column indexing starting at 0) and may be referred to as the col_indices vector. Another vector may be an array consisting of the non-zero values of the sparse matrix 111, which would be [−1, −2, −3, −4] for the example shown in FIG. 1A and may be referred to as the values vector. The third vector may be an array consisting of the number of non-zero values in each row of the sparse matrix 111, which would be [1, 1, 2] for the example shown in FIG. 1A, and may be referred to as the nnzs_per_row vector. In embodiments where the sparse matrix is stored as an array, circuitry may process the array to create the col_indices vector, values vector, and nnzs_per_row vector.

FIG. 1B shows a data flow 120 of a sparse matrix multiply in accordance with this disclosure. The col_indices vector 121 is used to select rows of the multiplicand 113 in the index select circuitry 131 to populate an index_select array (or matrix) 133. One row of the index_select array 133 is created for each entry of the col_indices vector 121 by selecting the indexed row from the multiplicand 113. So, because the first entry of the col_indices vector 121 is a "1", the first row of the index_select array 133 is set to be equal to the second row of the multiplicand 113 (the indexing in the arrays starts with 0) which is [3, 4]. Similarly, the second entry of the col_indices vector 121 is a "2" so the second row of the index_select array 133 is set to be equal to the third row of the multiplicand 113, [5, 6], and so on for each entry in the col_indices vector 121.

Multiplier circuitry is used to multiply values of a row of the index_select array 133 by a corresponding value in the values vector 122 to create a partial_products array 135. Note that the values vector 122 has the same number of entries as the index_select array 133 has columns as both were determined by the number of non-zero entries in the sparse multiplier array 111. So, each entry in the first row of the index_select array 133 is multiplied by the first entry of the values vector 122 to create the first row of the partial_products array 135, continuing for each row of the index_select array 133 and corresponding value in the values vector 122.

Index add circuitry 137 then uses the nnzs_per_row vector 123 to dynamically accumulate rows of the partial_products array 135 to generate the product matrix 115. Each entry of the nnzs_per_row vector 123 tells the index add circuitry 137 how many rows of the partial_products array 135 to add together to create the product matrix 115. So, in the example shown in FIG. 1B, the first two rows of the partial_products array 135 are directly copied to the product matrix 115 because the first two entries of the nnzs_per_row vector 123 are "1". But the third entry of the nnzs_per_row vector 123 is "2" so the next two rows (the third and fourth rows) of the partial_products array 135 are summed to create the final row of the product matrix 115. In some embodiments the multiplier circuitry and the index add circuitry 137 may be combined into dynamic accumulation circuitry.

FIG. 2A shows pseudocode 200 which provides an embodiment to multiply two matrices to create a product matrix. The pseudocode 200 may be implemented by one or more circuits, including computer instructions running on a general-purpose processor, one or more computational blocks of a reconfigurable dataflow processor, such as that shown in FIG. 5-8, one or more field-programmable gate-arrays, an application specific integrated circuit (ASIC), or any other circuitry suitable for the intended application. The pseudocode 200 may represent the functionality of computer code written in a high-level language and compiled to run on a general or special purpose computer, data to provide a configuration for a CGRA or FPGA device, functionality of a hardware description language such as VHDL or Verilog describing a configuration of hardware circuitry, or any other construct describing and/or controlling the operation of electronic circuitry.

In the pseudocode 200 (as well as the pseudocode 240 of FIG. 2B, pseudocode 260 of FIG. 2C, and the pseudocode 290 of FIG. 2C) the multiplier is a sparse matrix with dimensions of n rows and x columns. The multiplicand may be a dense matrix with dimensions of x rows and m columns. The product is a matrix with n rows and m columns. The pseudocode 200 is configured to perform multiplication using every row of the Sparse multiplier matrix and to implement the equation Sparse(n,x)×Dense(x,m)=Product (n,m) and assumes that every row of the Sparse matrix has at least one non-zero value. Note that the pseudocode 200 could be modified to detect all-zero rows of the Sparse matrix and handle the exception by zeroing out the corresponding rows of the Product matrix. An alternative way to allow the pseudocode 200 to operate properly with a multiplier matrix having one or more all-zero rows would be to modify the compression section (lines 201-213) to detect a row consisting of all zeros and to insert a 0 into the col_indices and values vector and a 1 in the nnzs_per_row vector which would cause an all-zero row to be generated for the Product matrix.

Lines 201-213 convert the Sparse(n,x) matrix into a compressed format which represents the matrix using three vectors, the col_indices, values, and nnzs_per_row vectors by going through each row in the loop starting at line 202 and each column in the loop starting at line 204. In the embodiment show, the index_select function is embedded with the generation of the col_indices, values, and nnzs_per_row vectors where once a non-zero value of the Sparse (n,x) array has been identified at line 205 and the col_indices and values vectors are populated at lines 206 and 207 respectively, and the selected row of the Dense(x,m) matrix is copied to the next row of the index_select matrix in line 208. Note that with the integration of the creation of the index_select matrix with the generation of the compressed version of the Sparse array, the col_indices vector is not actually used and would not need to be stored for later use by the pseudocode 200, but the code shown would still represent obtaining an index of columns of the multiplier matrix where the non-zero values are located. In addition, one of ordinary skill in the art can understand how the index_select matrix might be generated using the col_indices vector if the Sparse matrix was already compressed and stored as the col_indices, values, and nnzs_per_row vectors and no conversion is necessary.

Lines 214-230 perform a dynamic multiply accumulate operation on the index_select matrix using the values, and nnzs_per_row vectors by working through each row of the index_select matrix in the loop starting at line 216 and then going through each column in the loop starting at line 217 and checking to see if a new accumulation of rows should be started by seeing if the row accumulation counter "a" is still equal to the initial value (nnzs_per_row) for that row of the Product matrix. If it is, the values vector entry associated with the row of the index_select matrix is multiplied by the value in each column of that row to generate the respective Product value for the row in line 219. After that row of the index_select matrix has been dealt with, the accumulation counter is checked to see if that row of the Sparse matrix has more non-zero entries in line 224. If not, then the next non-zero row is set at row 225 and the row accumulation counter set to the next row's number of non-zero entries at line 226 to indicate the beginning of a new row in the final Product matrix. If, however, there are additional rows of the index_select matrix to multiply-accumulate into the current Product matrix row, the number of remaining entries to accumulate is decremented at line 228 and in the next pass of the row accumulation loop (lines 216-230) the next row of the index_select matrix is multiplied by of the next values vector entry and added to the previously accumulated value of the Product matrix in line 223 to generate the row of the Product matrix.

FIG. 2B shows pseudocode 240 which provides an embodiment to multiply two matrices to create a product matrix and is further configured to support a multiplier matrix containing one or more row with all zero values. The pseudocode 240 may be implemented by one or more circuits, including computer instructions running on a general-purpose processor, one or more computational blocks of a reconfigurable dataflow processor, such as that shown in FIG. 4-8, one or more field-programmable gate-arrays, an application specific integrated circuit (ASIC), or any other circuitry suitable for the intended application. The pseudocode 240 may represent the functionality of computer code written in a high-level language and compiled to run on a general or special purpose computer, data to provide a configuration for a CGRA or FPGA device, functionality of a hardware description language such as VHDL or Verilog describing a configuration of hardware circuitry, or any other construct describing and/or controlling the operation of electronic circuitry.

The pseudocode 240 receives the Sparse multiplier matrix pre-compressed as the col_indices, values, nnzs_per_row, and nz_row_num vectors and uses the col_indices vector to choose which rows of the Dense matrix to copy into the index_select matrix. This is done in the loop starting at line 241 which goes through each entry of the col_indices vector in order and copies the row of the Dense matrix corresponding to each col_indices vector in that order.

Lines 244-258 of the pseudocode 240 perform the dynamic accumulate stage of the sparse matrix multiply. An index ("p") used for the values vector and the current row of the index_select vector is initialized at line 244 and then a loop for each row of the Product matrix is started at line 245. To handle a row of the Sparse matrix that has all-zero values, the value of the nnzs_per_row entry for each row is checked to see if it is equal to '0' at line 246, and if it is, a temporary row vector is set to be all zeros at line 247. If there is at least one non-zero value in the row, values of the current index_select row are each multiplied by the current entry of the values vector (current as indicated by the index "p") and stored in the row vector at line 249 and the index "p" is incremented at line 250.

If there is more than one non-zero entry in the current row (as checked in line 251) then the remaining entries for that row in the values vector are used to multiply the individual values of the corresponding row of the index_select matrix and accumulated into the row vector in the loop starting at line 252. Once each entry in the values vector for a row of the Product matrix have been handled, the row vector is copied into that row of the Product matrix at line 257.

FIG. 2C shows pseudocode 260 which provides an embodiment to multiply two matrices to create a product matrix and is further configured to skip the multiplication of rows of the multiplier matrix that contain all zeros. It is similar to the pseudocode 200 of FIG. 2A except that it can handle a sparse multiplier matrix with rows consisting entirely of zero values by using a nz_row_num vector to keep track of which rows of the multiplier matrix (and therefore the product matrix) have at least one non-zero value. Embodiments using the method implemented by pseudocode 260 may be more efficient for sparse multiplier matrices with many rows having no non-zero values (i.e. many rows consisting entirely of zeros). The pseudocode 260 may be implemented by one or more circuits, including computer instructions running on a general-purpose processor, one or more computational blocks of a reconfigurable dataflow processor, such as that shown in FIG. 4-8, one or more field-programmable gate-arrays, an application specific integrated circuit (ASIC), or any other circuitry suitable for the intended application. The pseudocode 260 may represent the functionality of computer code written in a high-level language and compiled to run on a general or special purpose computer, data to provide a configuration for a CGRA or FPGA device, functionality of a hardware description language such as VHDL or Verilog describing a configuration of hardware circuitry, or any other construct describing and/or controlling the operation of electronic circuitry.

Lines 261-278 convert the Sparse(n,x) array into a compressed format represented by three vectors, the col_indices, values, and nnzs_per_row vectors much as is previously described for the pseudocode 200. The difference is that a nz_row_num vector is generated in lines 274-277 that provides an index of each row of the Sparse multiplier matrix that has at least one entry that is non-zero. Another difference is that the nnzs_per_row vector only has entries for each row of the Sparse matrix that has non-zero values, not an entry for every row of the Sparse matrix as in the pseudocode 200.

Lines 279-287 perform a dynamic multiply accumulate operation on the index_select matrix. Note that because not every row of the Product matrix will be written due to avoiding processing of rows of the Sparse matrix that are all zeros, the Product matrix is initialized to all zeros at line 279. The pseudocode 260 goes through each non-zero row of the Sparse matrix in the loop starting at line 281 and then goes through each non-zero value in each row in the loop starting at line 282 to generate a row of the Product matrix using an entry from the nz_row_num vector as an index into the Product matrix in lines 283-284 so that only those rows that may be non-zero are written. Note that because the Product matrix has been initialized to 0, no special case operation is required for the first non-zero value of the row as was done in lines 218-219 of pseudocode 200 in FIG. 2A.

FIG. 2D shows pseudocode 290 which provides an embodiment to multiply two matrices to create a product matrix and is further configured to skip the multiplication of rows of the multiplier matrix that contain all zeros. It is quite similar to the pseudocode 260 of FIG. 2C except that is assumes that the Sparse matrix has been previously compressed into the col_indices, values, nnzs_per_row, and nz_row_num vectors and it doesn't explicitly create the index_select matrix but embeds that functionality with the dynamic multiply-accumulate operation. The pseudocode 290, like the pseudocode 260, skips rows of the Sparse matrix that consist entirely of zero values. The pseudocode 290 may be implemented by one or more circuits, including computer instructions running on a general-purpose processor, one or more computational blocks of a reconfigurable dataflow processor, such as that shown in FIG. 4-8, one or more field-programmable gate-arrays, an application specific integrated circuit (ASIC), or any other circuitry suitable for the intended application. The pseudocode 280 may represent the functionality of computer code written in a high-level language and compiled to run on a general or special purpose computer, data to provide a configuration for a CGRA or FPGA device, functionality of a hardware description language such as VHDL or Verilog describing a configuration of hardware circuitry, or any other construct describing and/or controlling the operation of electronic circuitry.

At line 291, the Product output matrix is initialized to all zero values. This is done to allow all-zero rows of the multiplier (which generate all-zero rows in Product) to be skipped. Line 292 initializes a pointer into the col_indices and values vectors. The pseudocode 290 runs on successive non-zero rows of the Sparse multiplier matrix in the loop starting at line 293. Within each row, the loop of lines line 294-298 is run once for each non-zero value in the row (as indicated by the row's entry in nnzs_per_row) and products of the values vector elements and elements of each column of the corresponding row of the Dense multiplicand matrix are generated and accumulated to create a column in the Product matrix in lines 295-296. The col_indices vector is used to directly access the appropriate row of the Dense multiplicand matrix without creating a full intermediate matrix of rows (i.e. the index_select matrix) as was done in pseudocode 200, pseudocode 240, and pseudocode 260. The individual rows selected from the multiplicand matrix may be referred to as a submatrix of the intermediate matrix. Note that because the Product matrix has been initialized to 0, no special case operation is required for the first non-zero value of the row. After each non-zero value of a row in the Sparse multiplier matrix has been used to accumulate a row of values for the Product matrix, the pointer is incremented at line 297 to point to the next non-zero value of the Sparse multiplier matrix.

Various embodiments of the circuitry may combine various aspects of the matrix multiply operations (e.g. as shown in FIG. 2A, 2B, 2C, or 2D) in various ways for efficiency and to best map to the hardware configuration. Some embodiments may split operations into chunks and assign different groups of columns of the Dense multiplicand matrix to different circuitry to generate the corresponding columns of the Product matrix. Other embodiments may split the rows of the Dense multiplicand matrix into chunks and assign different groups of rows to different circuitry to generate the corresponding rows of the Product matrix. This type of splitting up of the problem and assigning different parts to different hardware may be referred to as vectorizing. Any of the pseudocode loops of the pseudocode 200, pseudocode 240, pseudocode 260, or pseudocode 290 may be vectorized by various embodiments. As an example of vectorization, some embodiments may utilize parallel datapaths, such as in a single-instruction, multiple data (SIMD) architecture for implementing some or all of the matrix multiply and/or accumulate and may work on multiple elements of a vector (such as the col_indices, value, and/or nnzs_per_row vectors) and/or multiple elements within a column or row of an array/matrix (such as the Sparse multiplier, Dense multiplicand, and/or index_select matrices) simultaneously.

Note that if the index_select matrix is explicitly created before the multiply-accumulate operation (e.g. as in pseudocode 200, pseudocode 240, and pseudocode 260), a correspondence between rows of the index_select matrix and the entries of the values vector is created which may help with certain vectorization schemes. For example if groups of rows of the Sparse multiplier matrix are assigned to different hardware blocks, only those rows of the index_select matrix associated with the rows (i.e. elements of the values vector) processed by a particular hardware block need be provided to that hardware block. This may reduce the amount of storage (and bandwidth) needed at each hardware block for embodiments where the Dense multiplicand matrix is large.

Figure 3:
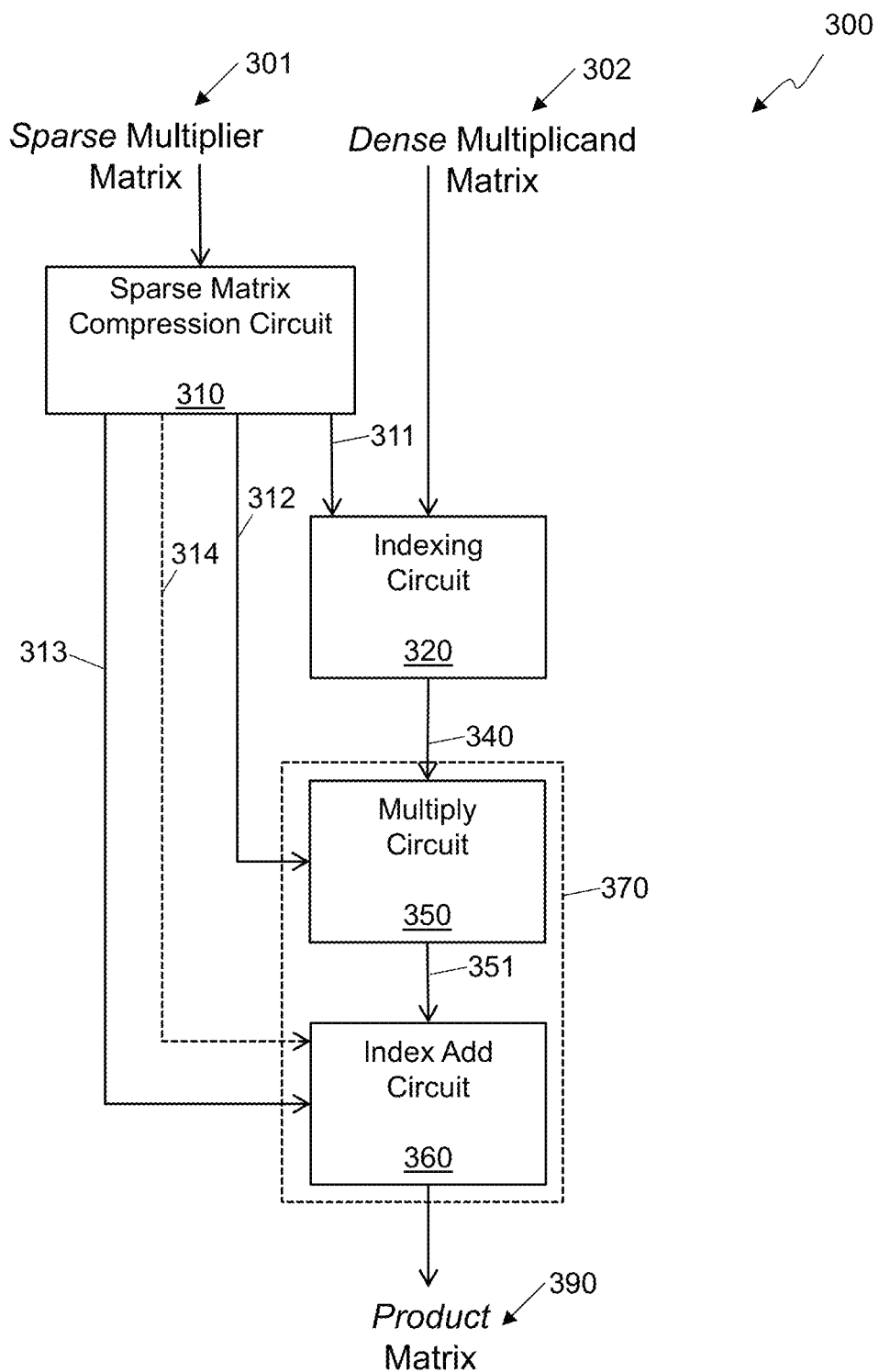
FIG. 3 shows a block diagram of an embodiment of a sparse matrix multiply circuit.

FIG. 3 shows a block diagram of an embodiment of a sparse matrix multiply circuit 300. The circuit receives a multiplier matrix 301 and a multiplicand matrix 302. Note that the embodiment shown in FIG. 3 has partitioned the matrix multiply circuitry 300 in one way, but other embodiments may partition the circuitry 300 differently and combine multiple blocks shown into a single block, break a block into multiple blocks, or partition the circuitry 300 into completely different blocks. The matrices 301, 302 can be represented in any format but some embodiments may receive a row-major ordered array of values for each of the two matrices 301, 302. The matrices 301, 302 may be received on separate inputs or on a common input, depending on the embodiment, and may be received over lines dedicated to receiving the matrices 301, 302 or on shared lines such as a network or a bus. In at least one embodiment, the network may be a mesh network with switches capable of routing the data for one or both matrices 301, 302 from distributed memory or processing nodes on a Coarse-Grained Reconfigurable Architecture (CGRA). The data for the matrices 301, 302 may be received in a parallel fashion with all data received in one clock cycle, in chunks where a set amount of the data is received at once (e.g. 128 bits) with multiple chunks received to provide all of the data for a matrix, serially over a single wire, or any combination thereof. In some embodiments, the matrices 301, 302 may have been previously stored in memory accessible to the matrix multiplier circuitry 300.

The multiplier matrix 301 may be a sparse matrix. While the multiplier circuitry 300 disclosed herein may function properly and provide an accurate result with any multiplier matrix, it may not be more efficient than traditional matrix multiplier methods if the multiplier matrix 301 is not sparse. A sparsity of a matrix may be defined as the number of zero-valued elements divided by the total number of elements of the matrix, so a 10×10 matrix with one non-zero element per row (i.e. 9 zero-valued elements per row) would have a sparsity of 90%. While there is no hard line that separates a sparse matrix from a dense matrix, as an example, a sparse matrix may be identified as having more elements with a zero value than those with a non-zero value (i.e. a sparsity of at least 50%). Another useful rule of thumb is that a sparse matrix may have an average of less than about 2 non-zero elements per row. As mentioned, while the multiplier circuitry 300 may generate an accurate result with any multiplier matrix 301, it may be more efficient as the number of non-zero elements of the multiplier matrix 301 goes down. The multiplicand matrix 302, however may be of any sparsity, but may be a dense matrix with a sparsity of less than 50%, or even 0%, in at least some embodiments. The efficiency of the multiplier circuitry 300 is unaffected by the sparsity of the multiplicand matrix 302.

In embodiments where the sparse multiplier matrix 301 has been pre-compressed into a few vectors describing its content, such as the col_indices vector, the values vector, and the nnzs_per_row vector described above, the circuitry 300 may not include the sparse matrix compression circuit 310, but in embodiments where the sparse multiplier matrix 301 is received as an array of data, the sparse matrix compression circuit 310 receives the array and generates a lossless compressed version of the matrix 301. The compressed version may include 3 or 4 one-dimensional arrays (i.e. vectors) that describe the content. In at least one embodiment, the vectors include an index 311 of columns of a multiplier matrix (e.g. a col_indices vector) that provides the column number of each non-zero entry in the matrix 301, an array of non-zero values 312 of the multiplier matrix (e.g.

a values vector), and a list 313 of a number of non-zero entries per row of the multiplier matrix (e.g. a nnzs_per_row vector). In some embodiments, a list 314 of the rows of the multiplier matrix which contain at least one non-zero value (e.g. a nz_row_num vector) is also provided. If the list 314 of rows containing at least one-non-zero value is not provided, an entry in each of the other vectors may be created for those rows with a '0' included for those rows in the col_indices vector and the values vector and a '1' in the nnzs_per_row vector to ensure that the multiplier 300 can properly handle multipliers having rows of all-zero values. Any type of circuitry may be used for the compression circuit 310, including a microprocessor with associated memory executing computer code, a hardware state machine with counters and circuitry to detect if an entry is 0, or some number of switches, memory and/or processing nodes of a CRGA that have been pre-configured to perform the compression. The compression circuit 310 may sequentially access memory storing the matrix 301 (or receive a stream of data for the sparse multiplier matrix 301), identify the non-zero locations, and generate the aforementioned vectors, no matter what type of circuitry is used for implementation.

Thus, the sparse matrix multiply circuit 300 may, in some embodiments, include circuitry 310 configured to obtain a multiplier matrix 301 and generate an index 311 of columns of the multiplier matrix, a first list 312 of the non-zero values of the multiplier matrix, and a second list 313 of a number of non-zero entries per row of the multiplier matrix. The index 311 of columns may be provided to the indexing circuit 320, the first list 312 may be provided to the multiply circuit 350, and the second list 313 may be provided to the index add circuit 360 (which may also be referred to as accumulation circuitry or selective accumulation circuitry), although the multiply circuit 350 and the index add circuit 360 may be combined in some embodiments so that both the first list and the second list may be provided to the combined circuitry. In other embodiments, the multiply circuit 350 may be combined with the indexing circuit 320.

The circuitry 300 also includes an indexing circuit 320 to generate an intermediate matrix 340 (i.e. an index_select matrix) from the multiplicand matrix 302 using the index 311 of columns. The intermediate matrix 340 has one row for each entry in the index 311 of columns with the row copied from a row of the multiplicand matrix 302 based on the corresponding entry of the index 311 of columns. The indexing circuit 320 may be implemented with any type of circuitry, including a processor, a hardware state machine, or some number of switches, memory and/or processing nodes of a CRGA that have been pre-configured to perform indexing. Thus, the sparse matrix multiply circuit 300 may include first circuitry configured to obtain a multiplicand matrix 302 and an index 311 of columns for non-zero values of a multiplier matrix 301 and to generate an intermediate matrix 340 that has one row per entry in the index 311 copied from a respective row of the multiplicand matrix 302 based on a corresponding entry in the index 311.

Thus, the multiplier circuit 300 includes first circuitry 320 configured to obtain a multiplicand matrix 302 and an index 311 of columns for non-zero values of a multiplier matrix 301 and to generate an intermediate matrix 340 that has one row per entry in the index 311 copied from a respective row of the multiplicand matrix 302 based on a corresponding entry in the index 311. The intermediate matrix 340 may be provided to a multiply circuit 350 or a multiply accumulate circuit 370.

The circuitry 300 includes a multiply circuitry 350 that multiplies the intermediate matrix 340 by the array of non-zero values 312 to generate a matrix of products 351 (e.g. a partial_products matrix). Each entry in a row of the intermediate matrix 340 is multiplied by the corresponding value of the array of non-zero values 312. The multiply circuit 350 may be implemented with any type of circuitry, including a processor, a hardware state machine, a dedicated hardware matrix multiplier, or some number of switches, memory and/or processing nodes of a CRGA that have been pre-configured to perform the matrix multiply operation. In some embodiments, the multiply circuit 350 may have a single instruction multiple data (SIMD) architecture configured to simultaneously multiply a plurality of elements of a row of the intermediate matrix by a non-zero value of the first list. In some embodiments the multiply circuitry 350 may be integrated into the indexing circuitry 320 so that the data in the selected rows of the multiplicand matrix 302 are multiplied by a value in the array of non-zero values 312 as a part of the generation of the intermediate matrix.

An index add circuit 360 is also include in the circuitry 300. The index add circuit 360 adds rows of the matrix of products 351 together as indicated by the list 313 of the number of non-zero entries per row to generate the Product matrix 390. Note that various embodiments may use a different type of vector, such as a row_index array of the CSR format which may be used in place of the nnzs_per_row vector as long as the index add circuit 360 can determine which rows of the matrix of products 351 to sum to generate the Product matrix 390. In embodiments where the nz_row_num vector 314 is provided, the index add circuit 360 can add all-zero rows into the Product matrix 390 for those rows not included in the nz_row_num vector 314 or alternatively, map the rows of the Product matrix 390 indicated by the nz_row_num vector 314 into an area of memory used for the Product matrix 390 which has been previously set to all zeros. The index add circuit 360 may be implemented with any type of circuitry, including a processor, a hardware state machine, or some number of switches, memory and/or processing nodes of a CGRA that have been pre-configured to perform index add operation. In some embodiments, the index add circuit 360 may have a single instruction multiple data (SIMD) architecture configured to simultaneously add a plurality of elements of rows of the matrix of products. In some embodiments the multiply circuit 350 and the index add circuit 360 are combined into a dynamic multiply accumulate circuit 370.

Thus, the sparse matrix multiply circuit 300 may include second circuitry 370, coupled to the first circuitry 320, and configured to receive the intermediate matrix 340 generated by the first circuitry 320, obtain a first list 312 of the non-zero values of the multiplier matrix 301 and a second list 313 of a number of non-zero entries per row of the multiplier matrix 301, and generate a product matrix 390 by multiplying the non-zero values of the first list 312 and elements of the intermediate matrix 340 and accumulating results of the multiplies based on the second list 312. The product matrix 390 can then be provided as a result of the matrix multiply. The second circuitry 370 may, in some embodiments, be further configured to generate a matrix of products 351 by multiplying each element of the intermediate matrix 340 by a non-zero value of the first list 312 corresponding to a row of said element and selectively add rows of the matrix of products 351 based on the list 313 of the number of non-zero entries per row to generate the product matrix 390. In addition or alternatively, the second circuitry 370 may be further configured to obtain a third list of rows of the multiplier matrix 301 having a least one non-zero value and selectively generate rows of the product matrix 390 included in the third list based on the first list 312 and the intermediate matrix 351, and set rows of the product matrix 390 not included in the third list to have all zero values.

The sparse matrix multiply circuit 300 may use any type of communication between the various circuit blocks 310, 320, 350, 360, including, but not limited to, one or more shared busses, point-to-point connections, circuit-switched connections, or packet-based network communication. The communication paths can be of any width and have any number of separate connections. In at least one embodiment, the sparse matrix multiply circuit 300 includes a network communicatively coupling the first circuitry (e.g. the indexing circuit 320) to the second circuitry (e.g. the multiply circuit 350 and/or the index add circuit 360). The network can include at least one switch and a plurality of links where a link in the plurality of links has a communication path capable of simultaneous transfer of a plurality of elements of the intermediate matrix 340. In at least one embodiment, the network may be implemented as an array level network as described below and the sparse matrix multiply circuit 300 may be constructed using a plurality of configurable units of one or more Coarse-Grained Reconfigurable Architecture Integrated Circuits (CGRA IC) as described below.

In one embodiment a matrix multiply apparatus 300 includes selection circuitry (e.g. indexing circuit 320), multiplication circuitry 350, and accumulation circuitry (e.g. index add circuit 360). The selection circuitry is configured to obtain a multiplicand matrix 302 and an index of columns 311 for non-zero values of a multiplier matrix 301 and to select a corresponding row of the multiplicand matrix 302 for each entry of the index of columns 311. The multiplication circuitry 350 configured to obtain a first list 312 of the non-zero values of the multiplier matrix 301 corresponding to the index of columns 311, and to multiply entries of the selected rows 340 of the multiplicand matrix 302 by a corresponding entry in the first list 312 to generate rows of partial products 351. The accumulation circuitry is configured to obtain a second list 313 of a number of non-zero entries per row of the multiplier matrix 301 and selectively add the rows of the partial products 351 based on the second list 313 to generate a result 390 of the matrix multiply.

Figure 4:
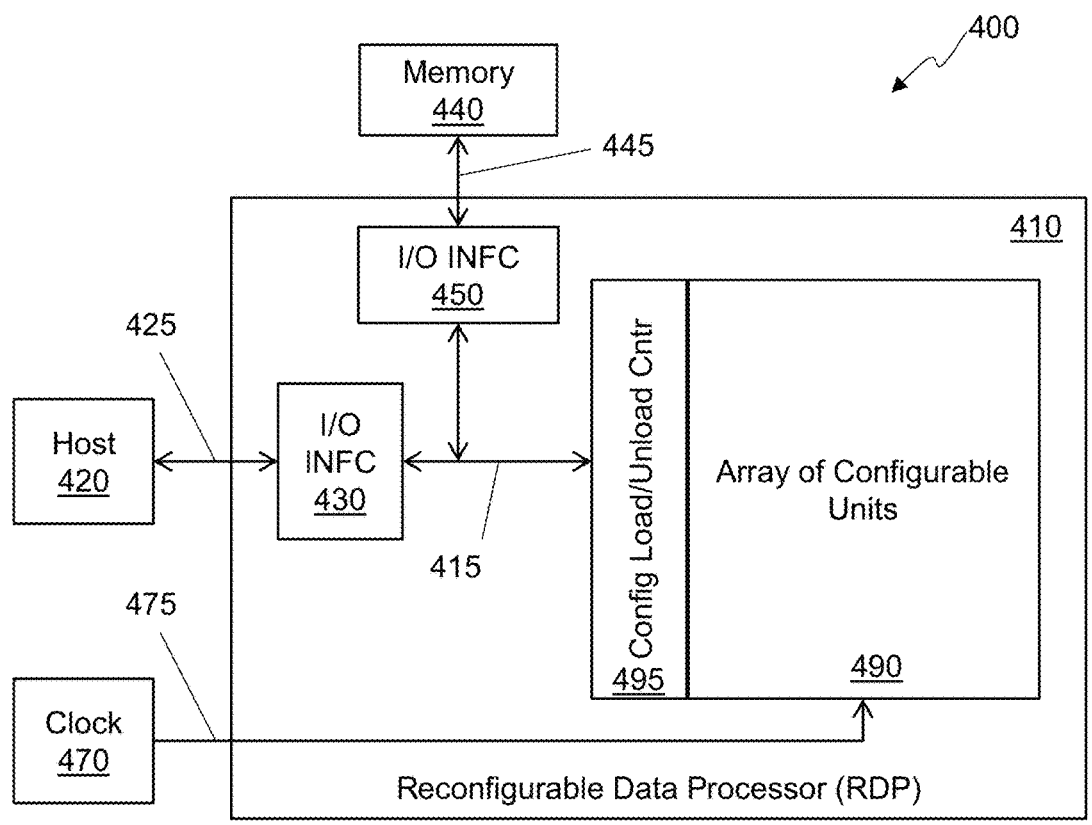
FIG. 4 is a system diagram illustrating a system including a host, a memory, and a reconfigurable data processor.

FIG. 4 is a system diagram illustrating a system including a host 420, a memory 440, and a reconfigurable data processor 410. As shown in the example of FIG. 4, the reconfigurable data processor 410 includes an array 490 of configurable units and a configuration load/unload controller 495. The phrase "configuration load/unload controller", as used herein, refers to a combination of a configuration load controller and a configuration unload controller. The configuration load controller and the configuration unload controller may be implemented using separate logic and data path resources or may be implemented using shared logic and data path resources as suits a particular embodiment.

The processor 410 includes an external I/O interface 430 connected to the host 420, and external I/O interface 450 connected to the memory 440. The I/O interfaces 430, 450 connect via a bus system 415 to the array 490 of configurable units and to the configuration load/unload controller 495. The bus system 415 may have a bus width of carrying one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can consist of one chunk, or other amounts of data as suits a particular embodiment.

To configure configurable units in the array 490 of configurable units with a configuration file, the host 420 can send the configuration file to the memory 440 via the interface 430, the bus system 415, and the interface 450 in the reconfigurable data processor 410. The configuration file can be loaded in many ways, as suits a particular architecture, including in data paths outside the configurable processor 410. The configuration file can be retrieved from the memory 440 via the memory interface 450. Chunks of the configuration file can then be sent in a distribution sequence to configurable units in the array 490 of configurable units in the reconfigurable data processor 410. The configuration file may be stored on one or more non-transitory machine readable medium as one or more instructions that in response to being provided to the array 490, cause the computing device to carry out a matrix multiply using any method disclosed herein, including the methods described in the pseudocode 200 of FIG. 2A, pseudocode 240 of FIG. 2B, pseudocode 260 of FIG. 2C, or pseudocode 290 of FIG. 2D.

An external clock generator 470 or other clock signal sources can provide a clock signal 475 or clock signals to elements in the reconfigurable data processor 410, including the array 490 of configurable units, and the bus system 415, and the external data I/O interfaces.

Figure 5:
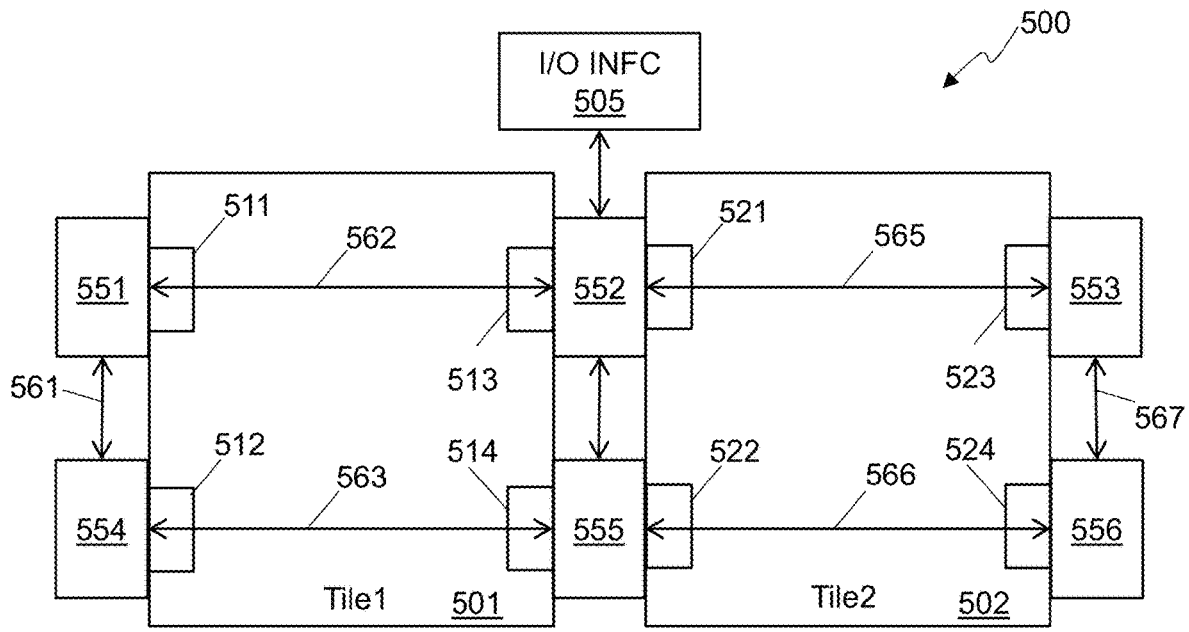
FIG. 5 is a simplified block diagram of a top-level network and components of a CGRA (Coarse-Grained Reconfigurable Architecture).

FIG. 5 is a simplified block diagram of components of a CGRA (Coarse Grain Reconfigurable Architecture) processor 500 which may be used as at least a part of the reconfigurable data processor 410 of FIG. 4. In this example, the CGRA processor 500 has 2 tiles (Tile1 501, Tile2 502). A tile 501, 502 comprises an array of configurable units connected to a bus system, including an array level network in this example. The bus system includes a top-level network connecting the tiles to external I/O interface 505 (or any number of interfaces). In other embodiments, different bus system configurations may be utilized. The configurable units in each tile are nodes on the array level network in this embodiment.

Each of the two tiles 501, 502 has 4 AGCUs (Address Generation and Coalescing Units) (511-514, 521-524). The AGCUs are nodes on the top-level network and nodes on the array level networks and include resources for routing data among nodes on the top-level network and nodes on the array level network in each tile.

Nodes on the top-level network in this example include one or more external I/O, including interface 505. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU 511 includes a configuration load/unload controller for Tile1 501, and MAGCU 521 includes a configuration load/unload controller for Tile2 502. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top level switches (551-556) connecting to each other as well as to other nodes on the top-level network, including the AGCUs 511-514, 521-524, and I/O interface 505. The top-level network includes links 561-567 connecting the top-level switches. Data travel in packets between the top-level switches on the links, and from the switches to the nodes on the network connected to the switches. For example, top level switches 551 and 552 are connected by a link 562, top level switches 554 and 555 are connected by a link 563, top level switches 551 and 554 are connected by a link 561, and top-level switches 552 and 553 are connected by a link 565. The links can include one or more buses and supporting control lines, including for example a chunk-wide bus (vector bus). For example, the top-level network can include data, request, and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 551, 552, 554 and 555 are connected to MAGCU 511, the upper right AGCU 513, the lower left AGCU 512, and the lower right AGCU 514 in the tile Tile1 501, respectively. Top level switches 552, 553, 555 and 556 are connected to MAGCU 521, the upper right AGCU 523, the lower left AGCU 522, and the lower right AGCU 524 in the tile Tile2 502, respectively. Top level switches can be connected one or more external I/O interfaces (e.g. interface 505).

Figure 6A:
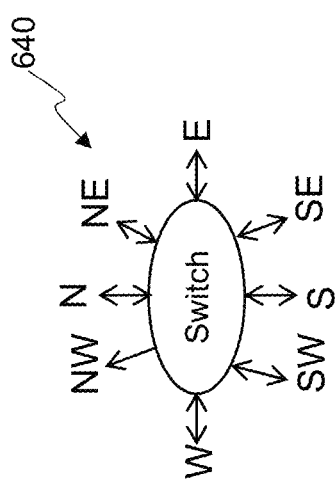
FIG. 6A illustrates an example switch unit for connecting elements in an array level network.
Figure 6:
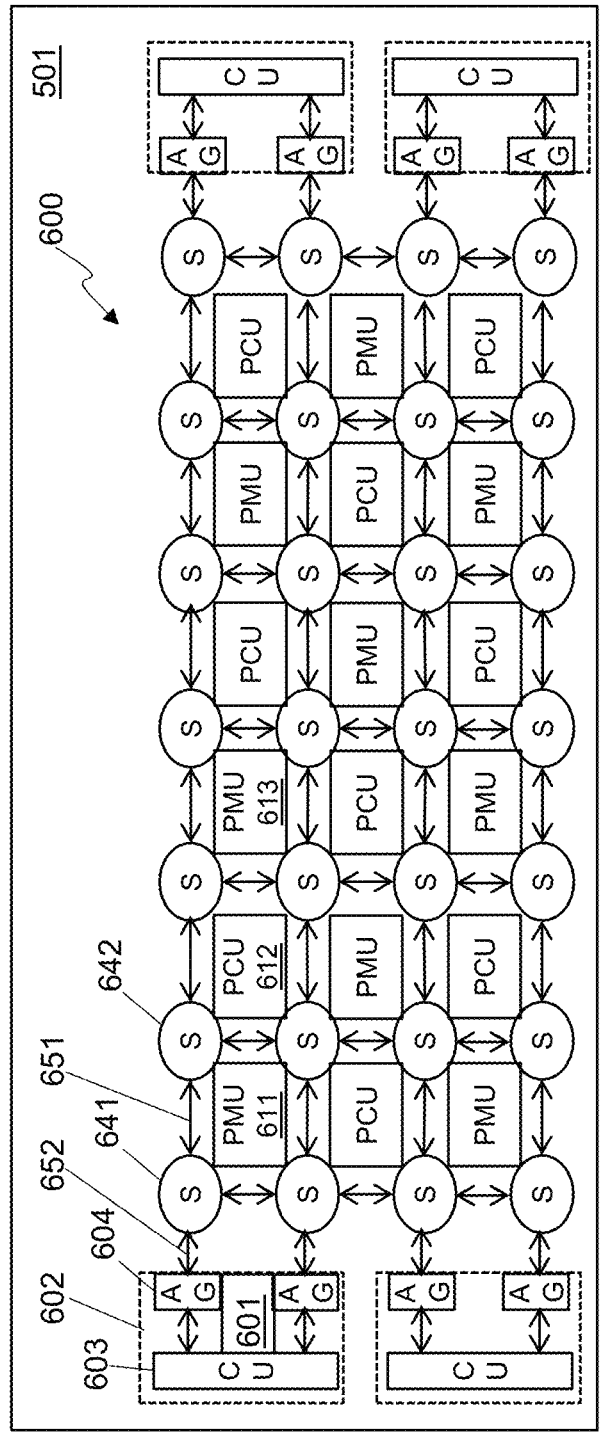
FIG. 6 is a simplified diagram of a tile and an array level network usable in the configuration of FIG. 5, where the configurable units are nodes on the array level network.

FIG. 6 is a simplified diagram of tile 501 (which may be identical to tile 502) of FIG. 5, where the configurable units in the array 600 are nodes on the array level network. In this example, the array of configurable units 600 includes a plurality of types of configurable units. The types of configurable units in this example include Pattern Compute Units (PCU) such as PCU 612, Pattern Memory Units (PMU) such as PMUs 611, 613, switch units (S) such as Switches 641, 642, and Address Generation and Coalescing Units (AGCU) such as AGCU 602. An AGCU includes two address generators (AG) such as AG 604 and a shared coalescing unit (CU) such as CU 603. An AGCU 602 of the tile 501 may include a configuration load/unload controller 601. For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein.

Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces. Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units by the configuration load/ unload controller 601 based on the contents of the bit file to allow all the components to execute a program (i.e., a machine). Program Load may also load data into a PMU memory.

The array level network includes links interconnecting configurable units in the array. The links in the array level network include one or more and, in this case three, kinds of physical buses: a chunk-level vector bus (e.g. 128 bits of data), a word-level scalar bus (e.g. 32 bits of data), and a multiple bit-level control bus. For instance, interconnect 651 between switch 641 and 642 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicates if the chunk is scratchpad memory or configuration store data.
Bits that form a chunk number.
Bits that indicate a column identifier.
Bits that indicate a row identifier.
Bits that indicate a component identifier.

For a load operation, the configuration load/unload controller 601 can send the number N of chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 6A illustrates an example switch unit 640 connecting elements in an array level network such as switches 641, 642 of the array 600 in FIG. 6. As shown in the example of FIG. 6A, a switch unit can have 8 interfaces. The North, South, East, and West interfaces of a switch unit are used for connections between switch units. The Northeast, Southeast, Northwest, and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 611 can be sent from the configuration load/unload controller 601 to the PMU 611, via a link 652, the switch unit 641, and a link between the Southeast (SE) vector interface of the switch unit 641 and the PMU 611.

In this example, one of the AGCUs is configured to be a master AGCU 602, which includes a configuration load/unload controller 601. The master AGCU 602 implements a register through which the host (120, FIG. 4) can send commands via the bus system to the master AGCU 602. The master AGCU 602 controls operations on an array of configurable units 600 in a tile 501 and implements a program control state machine to track the state of the tile 501 based on the commands it receives from the host through writes to the register. For every state transition, the master AGCU 602 issues commands to all components on the tile over a daisy chained command bus (see FIG. 7). The commands include a program reset command to reset configurable units in an array of configurable units 600 in a tile 501, and a program load command to load a configuration file to the configurable units.

The configuration load controller 601 in the master AGCU 602 is responsible for reading the configuration file from the memory and sending the configuration data to every configurable unit of the tile 501. The master AGCU 602 can read the configuration file from the memory at preferably the maximum throughput of the top-level network. The data read from memory are transmitted by the master AGCU 602 over the vector interface on the array level network to the corresponding configurable unit according to a distribution sequence.

In one embodiment, in a way that can reduce the wiring requirements within a configurable unit, configuration and status registers holding unit files to be loaded in a configuration load process or unloaded in a configuration unload process in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU 602 in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 4). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators (AGs) in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

Figure 7:
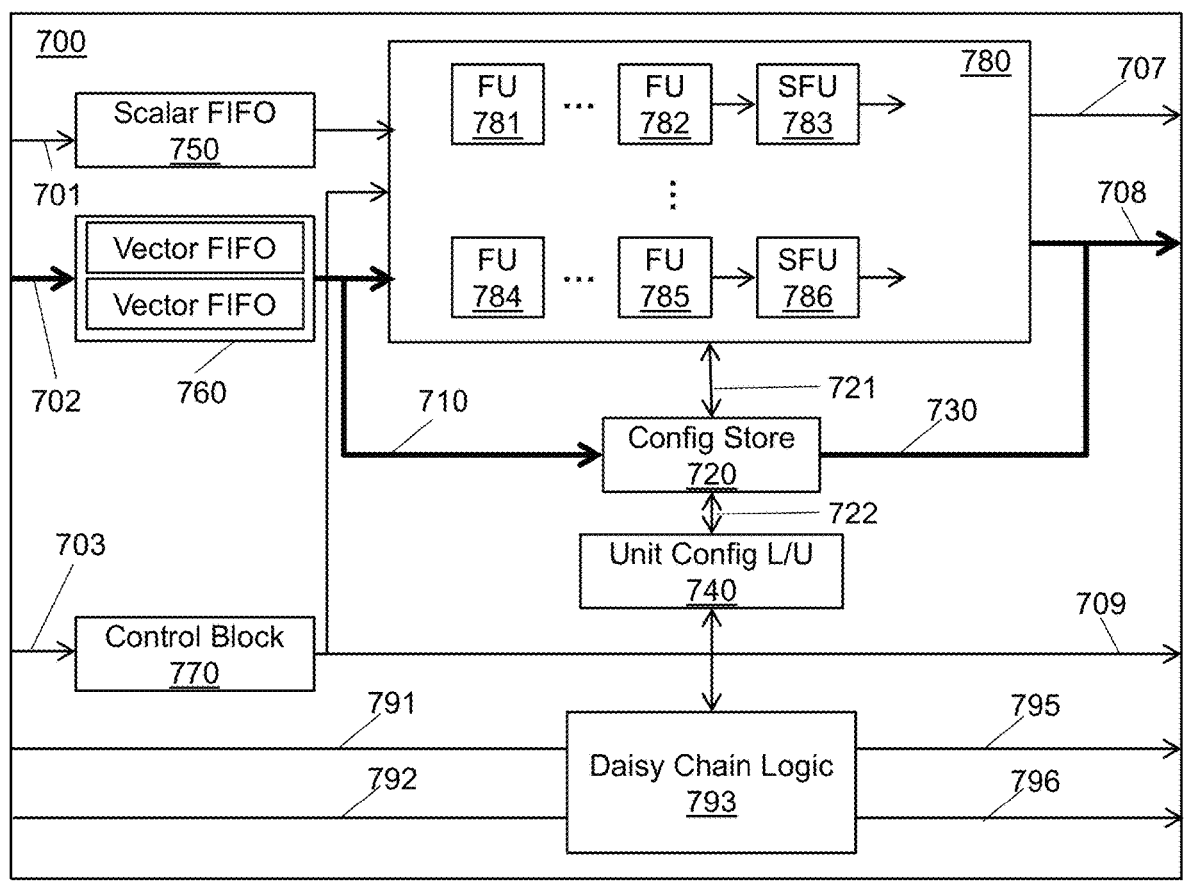
FIG. 7 is a block diagram illustrating an example configurable unit, such as a Pattern Compute Unit (PCU).

FIG. 7 is a block diagram illustrating an example configurable unit 700, such as a Pattern Compute Unit (PCU). A configurable unit 700 can interface with the scalar, vector, and control buses, in this example using three corresponding sets of inputs and outputs: scalar input 701, scalar output 707, vector input 702, vector output 708, control input 703, and control output 709. Scalar IOs can be used to communicate single words of data (e.g. 32 bits). Vector IOs can be used to communicate chunks of data (e.g. 128 bits) in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 770, and control outputs are provided by the control block 770.

Each vector input is buffered in this example using a vector FIFO in a vector FIFO block 760 which can include one or more vector FIFOs. Likewise, in this example, each scalar input is buffered using a scalar FIFO 750. Using input FIFOs decouples timing between data producers and consumers and simplifies inter-configurable-unit control logic by making it robust to input delay mismatches.

A configurable unit includes multiple reconfigurable datapaths in block 780. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 720 is connected to the multiple datapaths in block 780 via lines 721.

A configurable datapath organized as a multi-stage pipeline can include multiple functional units (e.g. 781-786) at respective stages. A functional unit may provide one or more of various types functions and may include an integer or floating-point arithmetic logic unit capable of a variety arithmetic and/or logic functions, a dedicated integer multiplier or multiply-accumulator, a dedicated floating-point multiplier or multiply-accumulator, or any other type of function. A special functional unit SFU (e.g. 783, 786) in a configurable datapath can include a configurable module 487 that comprises specialized computational circuits, the combinations of which can be optimized for particular implementations. In one embodiment, a special functional unit can be at the last stage of a multi-stage pipeline and can be configured to receive an input line from a functional unit (e.g. 782, 785) at a previous stage in a multi-stage pipeline. In some embodiments, a configurable unit like a PCU 700 can include many functional units and/or many special functional units which are configured for use in a particular graph using configuration data.

Configurable units in the array of configurable units include configuration data stores 720 (e.g. serial chains) to store unit files comprising a plurality of chunks (or sub-files of other sizes) of configuration data particular to the corresponding configurable units. Configurable units in the array of configurable units each include unit configuration load logic 740 connected to the configuration data store 720 via line 722, to execute a unit configuration load process. The unit configuration load process includes receiving, via the bus system (e.g. the vector inputs), chunks of a unit file particular to the configurable unit and loading the received chunks into the configuration data store 720 of the configurable unit. The unit file loaded into the configuration data store 720 can include configuration data 710, including opcodes and routing configuration, for circuits implementing a sparse matrix multiply as described herein.

The configuration data stores 720 in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 710 can be provided to a vector FIFO 760 as vector inputs, and then be transferred to the configuration data store 720. Output configuration data 730 can be unloaded from the configuration data store 720 using the vector outputs.

The CGRA processor uses a daisy-chained completion bus to indicate when a load/unload command has been completed. The master AGCU transmits the program load and unload commands to configurable units in the array of configurable units over a daisy-chained command bus. As shown in the example of FIG. 7, a daisy-chained completion bus 791, 795 and a daisy-chained command bus 792, 796 are connected to daisy-chain logic 793, which communicates with the unit configuration load logic 740.

Figure 8:
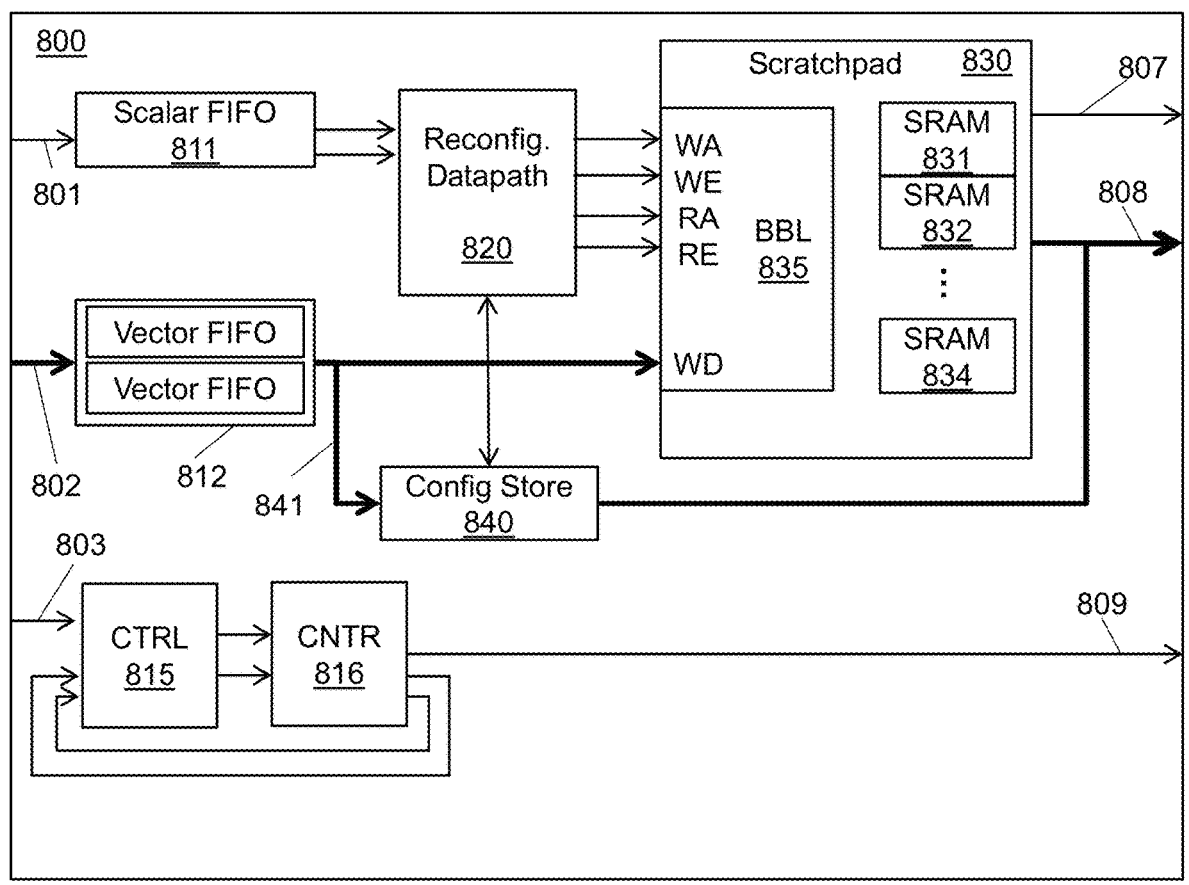
FIG. 8 is a block diagram illustrating an example of another configurable unit, such as a Pattern Memory Unit (PMU).

FIG. 8 is a block diagram illustrating an example configurable unit 800, such as a Pattern Memory Unit (PMU). A PMU 800 can contain scratchpad memory 830 coupled with a reconfigurable scalar data path 820 intended for address calculation (RA, WA) and control (WE, RE) of the scratchpad memory 830, along with the bus interfaces, scalar input 801, scalar output 807, vector input 802, vector output 808, control input 803, and control output 809. The vector input 802 can be used to provide write data WD to the scratchpad 830. The data path 820 can be organized as a multi-stage reconfigurable pipeline, including stages of functional units FUs and associated pipeline registers PRs that register inputs and outputs of the functional units. A PMU 800 can be used to store distributed on-chip memory throughout the array of reconfigurable units (490 in FIG. 4, 501, 502 in FIG. 5, or 600 in FIG. 6).

A scratchpad 830 is built with multiple SRAM banks (e.g. 831-834). Various embodiments may include any number of SRAM banks of any size, but in one embodiment the scratchpad may include 256 kilobytes (kB) of memory organized to allow at least one vector bus width of data (e.g. 128 bits or 16 bytes) at a time. Banking and buffering logic (BBL) 635 for the SRAM banks in the scratchpad can be configured to operate in several banking modes to support various access patterns. A configurable unit as described herein can include a lookup table stored in the scratchpad memory 830, from a configuration file or from other sources. In a configurable unit as described herein, the scalar data path 820 can translate a section of a raw input value I used for addressing lookup tables implementing the functions f'(I) and f"(I), into the addressing format utilized by the SRAM scratchpad memory 830, adding appropriate offsets and so on, to read the entries of the lookup table stored in the scratchpad memory 830 using the sections of the input value I. A PMU 800 can include write address calculation logic and read address calculation logic that provide write address WA, write enable WE, read address RA and read enable RE to the banking buffering logic 835. Based on the state of the local FIFOs 811 and 812 and external control inputs, the control block 815 can be configured to trigger the write address computation, read address computation, or both, by enabling the appropriate counters 816. A programmable counter chain 816 and control block 815 can trigger PMU execution through control output 809.

Similarly to the PCU 700 shown in FIG. 7, a PMU 800 in the array of configurable units include a configuration data store 840 to store unit files comprising a plurality of chunks (or sub-files of other sizes) of configuration data 841 particular to the PMU 800. The configuration data store 840 may be loaded similarly to the configuration data store 720 of FIG. 7 by unit configuration load logic connected to the configuration data store 840 to execute a unit configuration load process. The unit configuration load process includes receiving, via the bus system (e.g. the vector inputs), chunks of a unit file particular to the configurable unit and loading the received chunks into the configuration data store 840 of the configurable unit. The unit file loaded into the configuration data store 840 can include configuration data 841, such as, but not limited to, configuration and/or initialization data for the reconfigurable datapath 820, the programmable counter chain 816, and the control block 815.

So a Pattern Memory Unit (e.g. PMU) 800 can contain scratchpad memory coupled with a reconfigurable scalar datapath 820 intended for address calculation and communication using bus interfaces 801-803, 807-809 to communicate with a PCU 700. PMUs 800 can be used to distribute on-chip memory throughout the array of reconfigurable units. In one embodiment, address calculation within the 830 memory in the PMU 800 is performed on the PMU datapath 820, while the core computation is performed within the PCU 700.

Figure 9:
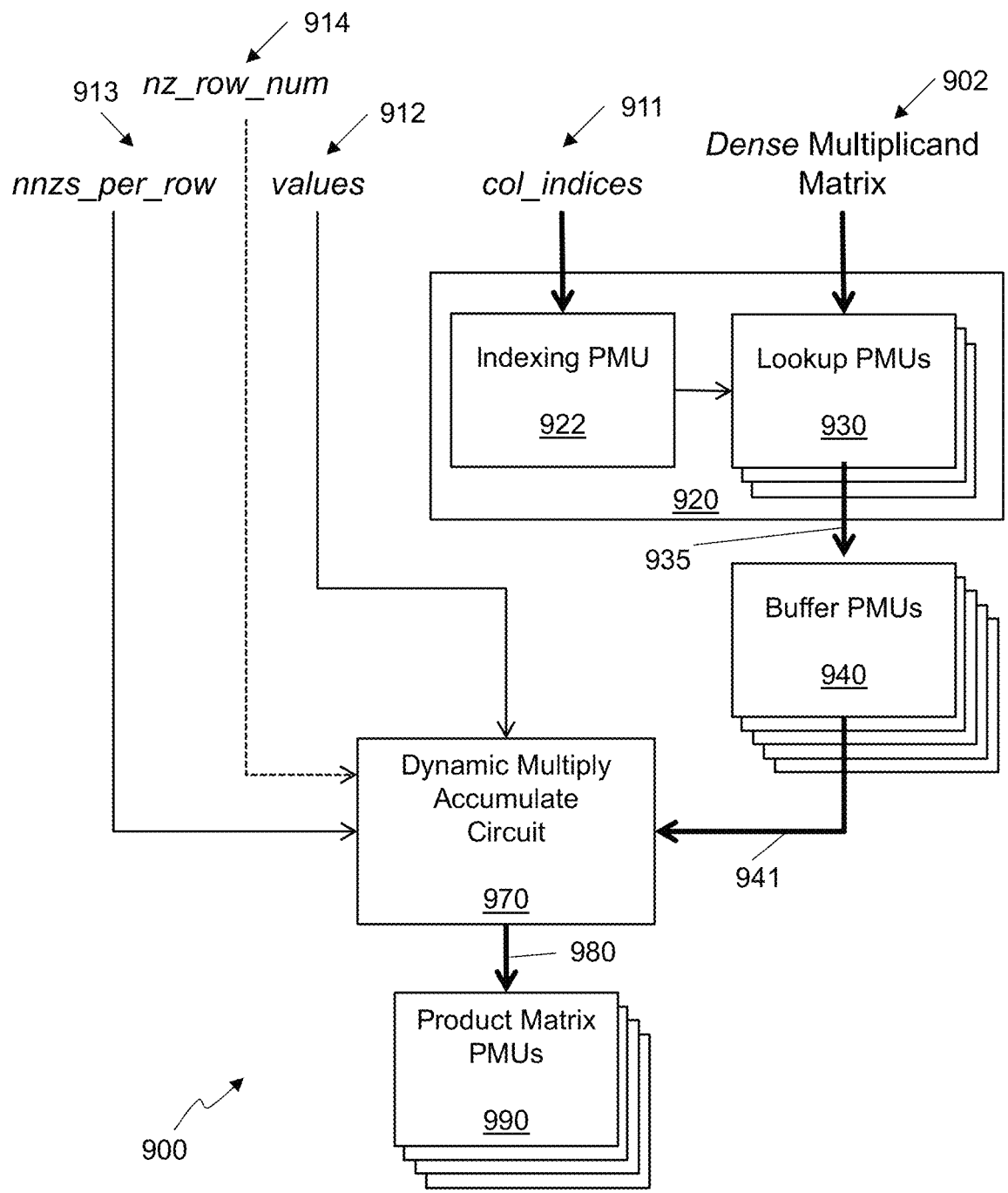
FIG. 9 shows a block diagram of an embodiment of a sparse matrix multiplier using configurable units of a CGRA.

FIG. 9 shows a block diagram of an embodiment of a sparse matrix multiplier 900 using configurable units of a Coarse-Grained Reconfigurable Architecture Integrated Circuit (CGRA IC) (which also may be referred to as reconfigurable data processor or RDP) such as described above. Some embodiments may use configurable units of more than one CGRA IC. The sparse matrix multiplier 900 generally organized in the same way as multiplier 300 of FIG. 3 with an indexing circuit 920 and the dynamic multiply accumulate circuit 970, where the dynamic multiply accumulate circuit 970 is shown to combine the functionality of the multiply circuit 350 and the index add circuit 360.

As in the sparse matrix multiply circuit 300, the indexing circuit 920 receives the Dense multiplicand matrix 902 and the col_indices vector 911 which provides an index of columns of non-zero values in the multiplier matrix. As in the sparse matrix multiply circuit 300, the indexing circuit 920 may be constructed using one or more configurable units (e.g. PMUs) of the CGRA IC. The Dense multiplicand matrix 902 may be provided over a vector bus to the lookup indexing circuit 920 allowing multiple entries of the matrix 902 to be transferred simultaneously. The col_indices vector 911 may also be provided over the vector bus but may be provided over a scalar bus in some embodiments. If the multiplicand matrix 902 is small enough to fit into a scratchpad memory of a single configurable unit (e.g. a PMU) some embodiments may utilize a PMU to implement the indexing circuit 920 by loading configuration data into the PMU to use the entries of the col_indices vector 911 to select successive rows of the multiplicand matrix 902 stored in the scratchpad memory of the PMU as rows of the intermediate matrix (i.e. an index_select matrix) and send that data 935 to buffer PMUs 940 to temporarily store the intermediate matrix. Note that if the data of a single row of the multiplicand matrix 902 is wider than the vector bus, multiple transfers of data 935 over the vector bus for each selected row.

Some embodiments may utilize one PMU as an indexing PMU 922 to receive the index of columns 911 and a set of lookup PMUs 930 to store the multiplicand matrix 902, with the indexing PMU 922 performing the calculation to determine where each successive row of the matrix 902 selected by the index 911 is located in the set of lookup PMUs 930. The number of lookup PMUs is dependent upon the respective sizes of the multiplicand matrix 902 and the scratchpad memory in the lookup PMUs 930. So, if the multiplicand matrix is 2 megabytes in size and the scratchpad memory of a single PMU is 256 kB, a minimum of 8 PMUs may be allocated in the CGRA IC for use as lookup PMUs.

The multiplicand matrix 902 may be divided amongst the assigned lookup PMUs in different ways, depending on the embodiment. Some embodiments may slice the matrix 902 into vertical slices (i.e. each slice has a contiguous set of columns of the matrix 902) with different slices sent to different PMUs. So, as a non-limiting example, if the multiplicand matrix 902 has 1000 rows of 100 columns and each entry in the matrix 902 is a 64-bit floating-point number, the matrix 902 would be 800,000 bytes and would require a minimum of four lookup PMUs 940 to store (assuming a scratchpad size of 256 kB/PMU). The matrix 902 may be divided into four 1000×25 submatrices and distributed to the four lookup PMUs 930 to be stored in row-major order. The indexing PMU 922 can look at a value in the col_indices vector and determine where to access the row in each PMU by multiplying the value from the col_indices vector by 200,000 (1000*25*8 bytes) for a byte address (or 1000*25/2=12,500 if the scratchpads have a 128 bit width) and sending the same address to each lookup PMU 930 which can then retrieve its columns for the selected row and independently send them 935 to the buffer PMUs 940 for reassembly of the partial rows into a full row. Alternatively, the matrix 902 may be divided into horizontal chunks of 250 rows and distributed to the lookup PMUs 930. With this organization, the index PMU 922 would determine which PMU is holding the row indicated by a value from the col_indices vector and then calculate the row address for the chunk and send it to the particular PMU of the lookup PMUs 930.

If the multiplicand matrix 902 is large and it may not be feasible to dedicate enough PMUs to fully hold the multiplicand matrix 902, the multiplicand matrix 902 may be broken into chunks with each chunk handled separately and the result reassembled in the buffer PMUs 930. For example, the multiplicand matrix may be divided into multiple vertical slices that are handled sequentially, with a first slice sent to the lookup PMUs 930 and controlled by the Indexing PMU 922 to send out slices of the intermediate matrix 935, followed by a second slice and so on until the entire matrix 902 has been processed. The slices of the intermediate matrix can then be reassembled into the full intermediate matrix in the buffer PMUs 940.

Thus, the first circuitry may include a first set 920 of one or more configurable units 922, 930 of a CGRA IC which may include one or more configuration stores that receive configuration data and configure the first set 920 of one or more configurable units 922, 930 to obtain the multiplicand matrix 902 and the index of columns 901 and perform selecting of the rows of the multiplicand matrix 902 based on the index of columns 901.

The number of buffer PMUs 940 required depends upon the size of the intermediate matrix which is dependent upon the number of non-zero entries in the sparse multiplier matrix (i.e. the length of the col_indices vector 911) and a size of a row of the multiplicand matrix 902. If the multiplicand matrix 902 has 100 columns and each entry in the matrix 902 is a 32-bit floating-point number, a row of the multiplicand matrix is 400 bytes. So if there are 10,000 non-zero values in the multiplier, the intermediate matrix would be 4,000,000 bytes in size, requiring 16 buffer PMUs 940 (assuming a scratchpad size of 256 kB/PMU). The buffer PMUs 940 may reorder the received data 935 as necessary for storage and/or transmission 941 as the intermediate network.

So in embodiments, the CGRA IC may include a set of one or more configurable units 940 (e.g. buffer PMUs) configured by configuration data to receive the selected rows 935 of the multiplicand matrix 902 (i.e. the intermediate matrix) and store them in the set of configurable units 940 as the intermediate matrix. The CGRA may include a network of switches and links that may be used by the set of one or more configurable units 940 to communicate with the other configurable units of the CGRA IC (e.g. an indexing PMU 922, lookup PMUs 930 and/or the configurable units of a dynamic multiply accumulate circuit 970).

Figure 9A:
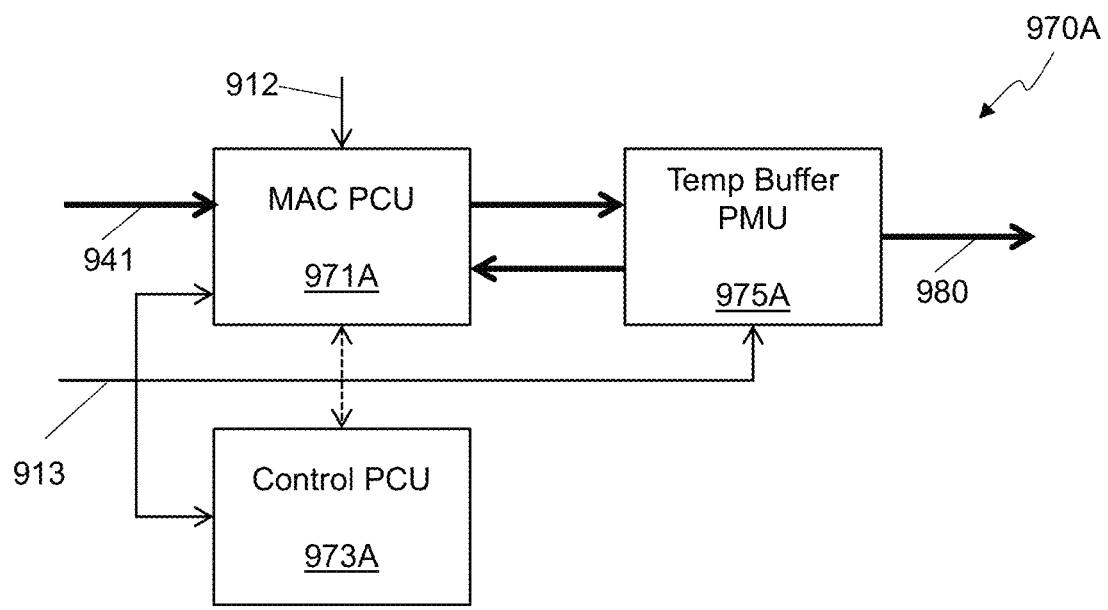
FIG. 9A shows a first embodiment of a dynamic multiply accumulator for a sparse matrix multiplier using configurable units of a CGRA.
Figure 9B:
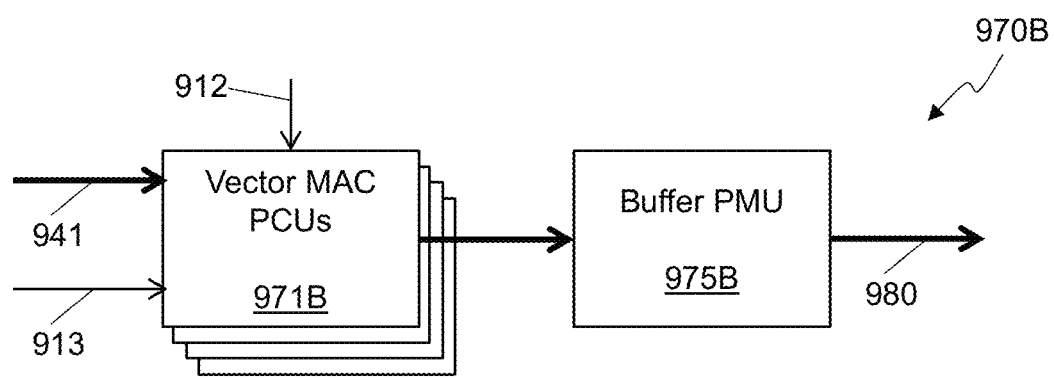
FIG. 9B shows a second embodiment of a dynamic multiply accumulator for a sparse matrix multiplier using configurable units of a CGRA.

The dynamic multiply accumulate circuit 970 can include a second set of one or more configurable units of the CGRA IC that are configured by configuration data to receive the intermediate matrix 941 from the buffer PMUs 940 and obtain a first list of values 912 of the multiplier matrix and a second list of a number of non-zero entries per row 913 of the multiplier matrix and multiply the non-zero values of the first list and elements of the intermediate matrix to create partial products. The second set of one or more configurable units are also configured by the configuration data to selectively accumulate the partial products based on the second list to generate a product matrix which is provided to the product matrix PMUs 990 as a result of the matrix multiply. In some embodiments, the second set of configurable units for the dynamic multiply accumulate circuit 970 may receive a nz_row_num vector 914 that provides a list of the rows of the multiplier matrix which at least one non-zero value which can then be used to either generate all-zero rows of the product matrix for those rows not listed in the nz_row_num vector 914 or to steer the rows of the product matrix listed in the nz_row_num vector 914 into an product matrix that was initialized to all zeros, or other alternatives to deal properly generate the product matrix using the calculated rows and all-zero rows. The second set of configurable units for the dynamic accumulate circuit 970 can be configured in different ways to accomplish the same multiply operation depending, for example, on different trade-offs between speed and a number of configurable units dedicated to the dynamic multiply accumulate circuit 970, two of which are shown in FIG. 9A and FIG. 9B. A compiler which understands the size of the matrices and the overall usage of the configurable units in the CGRA IC may make a determination of which embodiment of the dynamic accumulate circuit 970 to configure.

The product matrix PMUs 990 also may be implemented using a set of configurable units of the CGRA IC. A number of PMUs 990 needed to store the product matrix depends on the size of the Product matrix as discussed for the lookup PMUs 930 and the buffer PMUs 940. The set of configurable units of the product matrix PMUs 990 are configured by configuration data to receive data 980 for the Product matrix, store the Product matrix in the set of configurable units, and provide the Product matrix on links of the CGRA IC to other configurable units and/or to a top-level network of the CGRA IC.

In many cases, the intermediate matrix is larger than the multiplicand matrix 902 and the Product matrix as it has one row for each non-zero entry of the multiplier matrix. If the intermediate matrix is too large to dedicate enough PMUs to fully hold, it may be broken into submatrices with each submatrix handled separately. This may be done in cooperation with the other parts of the sparse matrix multiplier 900. For example, if the multiplicand matrix is divided into multiple vertical slices that are handled sequentially, then vertical slices of the intermediate matrix (i.e. submatrices) may be handled sequentially, and the dynamic accumulate circuit 970 may generate vertical slices of the Product matrix which are then reassembled in the product matrix PMUs 990 into the full Product matrix or even provided as slices. Alternatively, the multiplier matrix may be divided into horizontal slices with a subset of the nnzs_per_row vector 913, the values vector 912 and the col_indices vector 911 associated with each horizontal slice. The portion of the intermediate matrix (i.e. submatrix) associated with a slice of the multiplier matrix may be generated and stored in the buffer PMUs 940 and the rows of the Product matrix associated with that slice of the multiplier matrix generated by the dynamic multiply accumulate circuit 970 and stored in the product matrix PMUs 990 before moving to the next horizontal slice of the multiplier matrix. A hybrid approach dividing the multiplier matrix into horizontal slices and the multiplicand matrix into vertical slices is also envisioned. The submatrix can be of any size and may in some cases be small enough to transfer in a single chunk on the vector bus which may obviate the buffer for the intermediate matrix. So, in embodiments, the matrix multiplier circuitry may generate the intermediate matrix as two or more submatrices that include a first submatrix and a second submatrix. The matrix multiplier circuitry may then receive the first submatrix and generate a third submatrix to form a portion of the product matrix based on the first submatrix without the second submatrix and receive the second submatrix and generate a fourth submatrix to form a portion of the product matrix based on the second submatrix without the first submatrix. In some embodiments, the circuitry may overwrite the first submatrix with the second submatrix once the portion of the product matrix that is dependent upon the first submatrix of the intermediate matrix has been generated. A compiler which understands the size of the matrices and the overall usage of the configurable units in the CGRA IC may decide how to divide up the matrix multiply operation if needed.

FIG. 9A shows a first embodiment of a dynamic multiply accumulator 970A for a sparse matrix multiplier using configurable units of a CGRA that includes an array level network with switches and links that include a vector bus, a scalar bus, and a control bus. The first embodiment 970A uses a fixed number of configurable units independent of the size of the intermediate matrix and includes a multiply-accumulate (MAC) PCU 971A and a temporary buffer PMU 975A as well as a control PCU 973A. The MAC PCU 971A receives a row of the intermediate vector 941 over the vector bus and a value 912 on the scalar bus and takes one of two different actions based which of two configurations loaded into its configuration store is enabled. Note that the CGRA IC may include an array level network with links that provide a communication path (i.e. the vector bus) capable of simultaneous transfer of a plurality of elements of the intermediate matrix. The configuration store of the MAC PCU 971A includes first configuration data to configure the MAC PCU 971A to simultaneously multiply a first plurality of elements (e.g. a subset of columns of a single row) of the intermediate matrix by a first non-zero value of the first list and store a first intermediate result of the multiplies in a scratchpad memory of the temporary buffer PMU 975A. The configuration store of the MAC PCU 971A also includes the second configuration data to configure the MAC PCU 971A to retrieve the first intermediate result of the multiplies from the temporary buffer PMU 975A, and then simultaneously multiply a second plurality of elements (e.g. the same subset of columns of another row) of the intermediate matrix by a second non-zero value of the first list and accumulate with the first intermediate result to generate a second intermediate result before storing the second intermediate result in the scratchpad memory of temporary buffer PMU 975A.

The control PCU 973A receives the list of number of non-zero entries per row 913 and controls which configuration of the MAC PCU 971A is enabled. Some embodiments may also receive a list of the rows of the multiplier matrix that are non-zero (i.e. nz_row_num vector 914) but this is not shown in FIG. 9A. So to start out the control PCU 973 receives the number of non-zero entries of the first row 913 of the multiplier matrix and the MAC PCU 971A receives first non-zero value 912 and a first chunk of the first row of the intermediate matrix, where the first chunk is a vector bus width which may be less than a full row of the intermediate matrix. So for example, if the intermediate matrix has 40 rows of 32-bit values and the vector bus is 16 bytes (128 bits) wide, it will take 10 vector bus transfers to send a full row of the intermediate matrix as 10 chunks. The control PCU 973A determines that this is the first non-zero value of a row and enables the first configuration of the MAC PCU 971A so as the 10 chunks data (4×32-bit values per chunk) are received, the MAC PCU 971 simultaneously multiplies the four 32-bit values of each chunk by the first value using a single instruction multiple data (SIMD) architecture and stores them into the temporary buffer PMU 975A.

Based on the value of the number of non-zero entries for the first row, the control PCU 973 determines whether to change the configuration of the MAC PCU 971A by enabling the second configuration to accumulate another row of the intermediate matrix into the product matrix, or to leave the first configuration enabled to go on to the next row of the product matrix. So if the first row had a number of non-zero entries of 1, the first intermediate result (all 10 chunks of it) constitutes the first row of the product matrix and can be sent 980 from the temporary buffer PMU 975A to the product matrix PMUs 990. The control PCU 973A leaves the MAC PCU 971A in the first configuration and a number of non-zero entries per row 913 for the second row is examined as the second non-zero value 912 and the 10 chunks of the second row 941 of the intermediate matrix is received, multiplied, and sent to the temporary buffer PMU 975A. If the second row has more than one non-zero value, the control PCU 973A switches the MAC PCU 971A to its second configuration as the third value and third row of the intermediate matrix are received. The MAC PCU 971A retrieves the intermediate result for each chunk from the temporary buffer PMU 975A and simultaneously multiplies chunks of the third row of the intermediate matrix by the third non-zero value and adds their product to the respective chunk of the intermediate result to generate chunks of a second intermediate result which are stored back into the scratchpad memory of the temporary buffer PMU 975A. This is repeated for each non-zero value associated with a row as indicated by the non-zero entries per row list (e.g. the nnzs_per_row vector). Once the indicated number of rows have been accumulated, the control PCU 973A sets the MAC PCU 971A back into the first configuration to start a new row of the product matrix. Thus, a control PCU 973 (i.e. a configurable unit) is configured to control which of the first configuration data and the second configuration data is enabled for the MAC PCU 971A (another configurable unit). In some embodiments, a variation of the first embodiment 970A may include multiple sets of the MAC PCU 971A and temporary buffer PMU 975A to be able to process a bigger portion of a row of the intermediate matrix at a time by vertically slicing the intermediate matrix into submatrices and assigning each submatrix to a set of MAC PCU and temporary buffer PMU. This may help efficiency if the multiplicand matrix (and therefore the intermediate matrix) has a very large number of columns.

FIG. 9B shows a second embodiment 970B of a dynamic multiply accumulator for a sparse matrix multiplier using configurable units of a CGRA. The second embodiment 970B may be used if enough PCUs may be dedicated to receive a full row of the intermediate matrix at once to avoid the need to read intermediate results back from a buffer PMU. In the second embodiment 970B each vector MAC PCU 971B receives a chunk of the row 941 of the intermediate matrix as well as the list of non-zero values 912 and the number of non-zero values per row 913. Some embodiments may also receive a list of the rows of the multiplier matrix that are non-zero (i.e. nz_row_num vector 914) but this is not shown in FIG. 9B. Each vector MAC PCU 971B multiplies its incoming chunks of the row by the corresponding non-zero value and can internally buffer the result. So if there are more than one non-zero values in a row, the vector MAC PCUs 971B can selectively accumulate the product of the chunk and the value with a previous accumulated value stored in the vector MAC PCUs 971B. Once a row has been fully accumulated, it can be sent to the buffer PMU 975B before being sent 980 to the product matrix PMUs 990.

Figure 10:
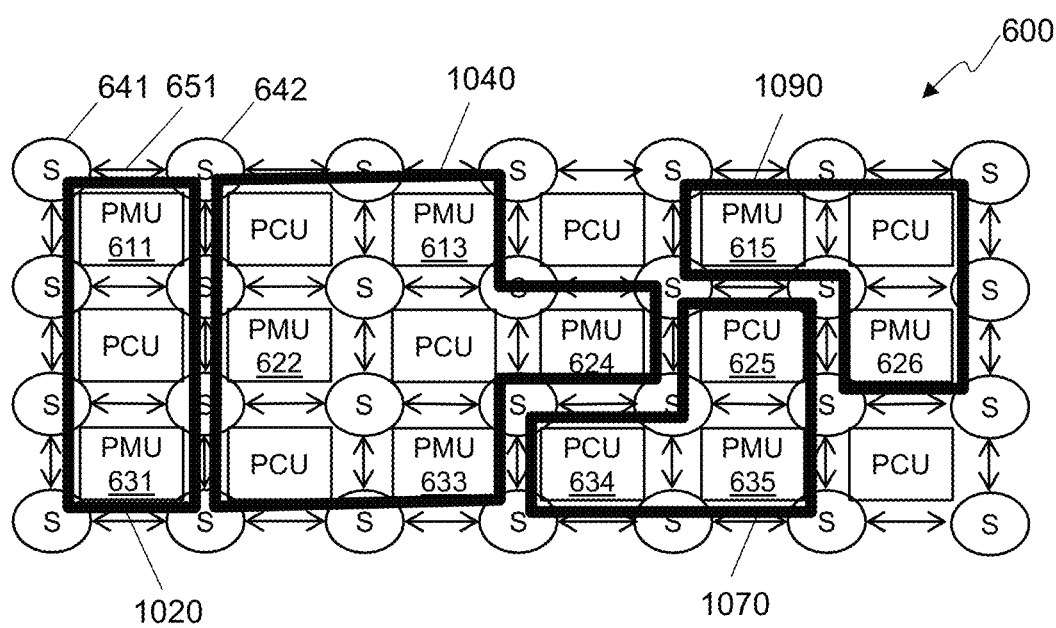
FIG. 10 shows a simple diagram of an embodiment of an array of configurable units of a CGRA configured to act as a sparse matrix multiplier.

FIG. 10 shows a block diagram of an embodiment of the array of configurable units 600 of a CGRA (as also shown in FIG. 6) configured to act as a sparse matrix multiplier for a particular sparse matrix operation. Many other embodiments of a sparse matrix multiplier may be possible using a CGRA. The array of configurable units 600 includes a plurality of types of configurable units, including, in this example, Pattern Compute Units (PCU) (such as PCUs 625, 634), Pattern Memory Units (PMU) (such as PMUs 611, 613, 615, 622, 624, 626, 631, 633, 635), and switch units (S) (such as switches 641, 642) coupled by a plurality of bus links (such as link 651 between switch 641 and switch 642). As described earlier, each of these configurable units contains a configuration store that can be loaded with bit file (including configuration information) that configures the unit to perform a particular operation or sequence of operations. In the example shown in FIG. 10, a subset of the configurable units of the array 600 have been configured to operate as a sparse matrix multiplier 900 as described herein.

In the example shown in FIG. 10 the array of configurable units 600 is configured to handle a sparse matrix multiply of 16-bit signed integer data with a sparse multiplier having 3,500 rows and 500 columns with a total of 12,000 non-zero values, and a multiplicand of 500 rows and 40 columns (i.e. 40,000 bytes of data), generating a product matrix of 3500 rows by 40 columns (i.e. 280,000 bytes of data). Thus, the intermediate matrix (i.e. the index_select matrix) in this example is 12,000 rows by 40 columns (i.e. 960,000 bytes of data).

A first set of the configurable units 1020 is configured by their bit files (including configuration data) to act as the indexing PMU 922 (e.g. PMU 611) and lookup PMUs 930 (e.g. PMU 631) as shown in FIG. 9, which may be referred to as the indexing stage of the sparse matrix multiply. The first set of configurable units 1020 can receive the dense multiplicand matrix over the vector bus through the switches and links of the array of configurable units 600 as an array of data as well as a first vector providing an index of columns of the sparse multiplier matrix having non-zero entries through one or more switches. Because the multiplicand matrix is less than the size of a scratchpad memory (e.g. 256 kB), it can fit into a single lookup PMU 631 which can select successive rows of the multiplicand matrix under control of the indexing PMU 611. As discussed earlier, different numbers of PMUs (from 1 to many) may be assigned to the index stage of the sparse matrix multiply, depending at least in part on the size of the multiplicand matrix. The first set of configurable units 1020 are configured to generate an index_select matrix (i.e. an intermediate matrix) as described herein based on the index and the multiplicand matrix and to provide the index_select matrix to a second set of configurable units 1040.

The second set of configurable units 1040 are configured by their configuration data to receive data of the index_select matrix from the first set of configurable units 1020 through the switches and links of the array of configurable units 600 and to temporarily store the index_select matrix. In some embodiments, the elements of the index_select matrix may not arrive in row-major order so the second set of configurable units 1040 may organize the index_select matrix into a desired order in its scratchpad memories that may be different than a received order. The number of PMUs included in the second set of configurable units 1040 can be based, at least in part, on a size of the index_select matrix and the size of a PMU's scratchpad memory. In the example shown in FIG. 10, the index_select matrix is 960,000 bytes, which is more than 3 times the size of the example scratchpad memory of 256 kB, so four PMUs 613, 622, 633 are used for the second set of configurable units 1040.

The second set of configurable units 1040 are further configured to provide the index_select matrix through the switches and links of the array of configurable units 600 to a third set of configurable units 1070 which act as the dynamic multiply accumulate stage of the sparse matrix multiply. In the embodiment shown in FIG. 10, the third set of configurable units 1070 are configured to act as a control PCU 973A (e.g. PCU 634), a MAC PCU 971A (e.g. PCU 625), and a buffer PMU 975A (e.g. PMU 635). The third set of configurable units 1070 receive the values vector, the nnzs_per_row vector, and in some embodiments, nz_row_num vector through the switches and links of the array of configurable units 600 and performs a dynamic multiply accumulate to produce the Product matrix as described for the dynamic multiply accumulate circuit 970A of FIG. 9A. Other embodiments may use the dynamic multiply accumulate circuit 970B of FIG. 9B. The Product matrix may then be provided by the third set of configurable units 1070 through the switches and links of the array of configurable units 600 to a fourth set of configurable units 1090 for storage until used by other configurable units or retrieved by another device (e.g. the host computer 420 of FIG. 4).

The fourth set of configurable units 1090 are configured by their configuration data to receive data of the Product matrix from the third set of configurable units 1070 through the switches and links of the array of configurable units 600 and to store the Product matrix. In some embodiments, the elements of the Product matrix may not arrive in row-major order so the fourth set of configurable units 1090 may organize the Product matrix into a desired order in its scratchpad memories that may be different than a received order. The number of PMUs included in the fourth set of configurable units 1090 can be based, at least in part, on a size of the Product matrix and the size of a PMU's scratchpad memory. In the example shown in FIG. 10, the product matrix is 280,000 bytes, which between one and two times the size of the example scratchpad memory of 256 kB, so two PMUs 615, 626 are used for the fourth set of configurable units 1090.

The configuration data for the first set of configurable units 1020 (e.g. PMUs 611, 631), the second set of configurable units 1040 (e.g. PMUs 613, 622, 624, 633), the third set of configurable units 1070 (e.g. PCUs 625, 634 and PMU 635), and/or the fourth set of configurable units 1090 (e.g. PMUs 615, 626) may be stored in a non-transitory machine readable medium comprising one or more instructions (e.g. configuration data) that in response to being executed on a computing device (e.g. the array of configurable units 600) cause the computing device to carry out a matrix multiply using any method described herein. Thus, the one or more instructions may comprise configuration data for a one or more configurable units of one or more Coarse-Grained Reconfigurable Architecture Integrated Circuits (CGRA IC). As an example, the method carried out under control of the configuration data (i.e. instructions) may include obtaining a multiplicand matrix, an index of columns for non-zero values of a multiplier matrix, a first list of non-zero values of the multiplier matrix, and a second list of a number of non-zero entries per row of the multiplier matrix and selecting rows of the multiplicand matrix based on respective entries of the index of columns of the multiplier matrix to create an intermediate matrix having one row per entry in said index. The method executed on the computing device may also include multiplying the non-zero values of the first list and elements of the intermediate matrix to create partial products, selectively accumulating the partial products based on the second list to generate a product matrix, and providing the product matrix as a result of the matrix multiply. Said method may, in some embodiments, include obtaining a third list of rows of the multiplier matrix having a least one non-zero value, selectively generating rows of the product matrix included in the third list based on the first list and the intermediate matrix, and setting rows of the product matrix not included in the third list to have all zero values. Some embodiments may include obtaining the multiplier matrix, and generating the index of columns, the first list, and the second list based on the multiplier matrix under control of the configuration data (i.e. one or more instructions).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions or by configuration information for a field-programmable gate array (FPGA) or CGRA IC. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Similarly, the configuration information for the FPGA/CGRA IC may be provided to the FPGA/CGRA IC and configure the FPGA/CGRA IC to produce a machine which creates means for implementing the functions/acts specified in the flowchart and/or block diagram block or blocks.

These computer program instructions or FPGA/CGRA IC configuration information may be stored in a computer readable medium that can direct a computer, other programmable data processing apparatus, FPGA/CGRA IC, or other devices to function in a particular manner, such that the data stored in the computer readable medium produce an article of manufacture including instructions which implement the function/act specified in the flowchart and/or block diagram block or blocks. The computer program instructions or FPGA/CGRA IC configuration information may also be loaded onto a computer, FPGA/CGRA IC, other programmable data processing apparatus, or other devices to cause a series of operational steps to be performed on the computer, FPGA/CGRA IC, other programmable apparatus, or other devices to produce a computer implemented process for implementing the functions/acts specified in the flowchart and/or block diagram block or blocks.

The flowchart and/or block diagrams in the figures help to illustrate the architecture, functionality, and operation of possible implementations of systems, methods, and computer program products of various embodiments. In this regard, each block in the flowchart or block diagrams may represent a module, segment, or portion of code comprising one or more executable instructions, or a block of circuitry, for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 11:
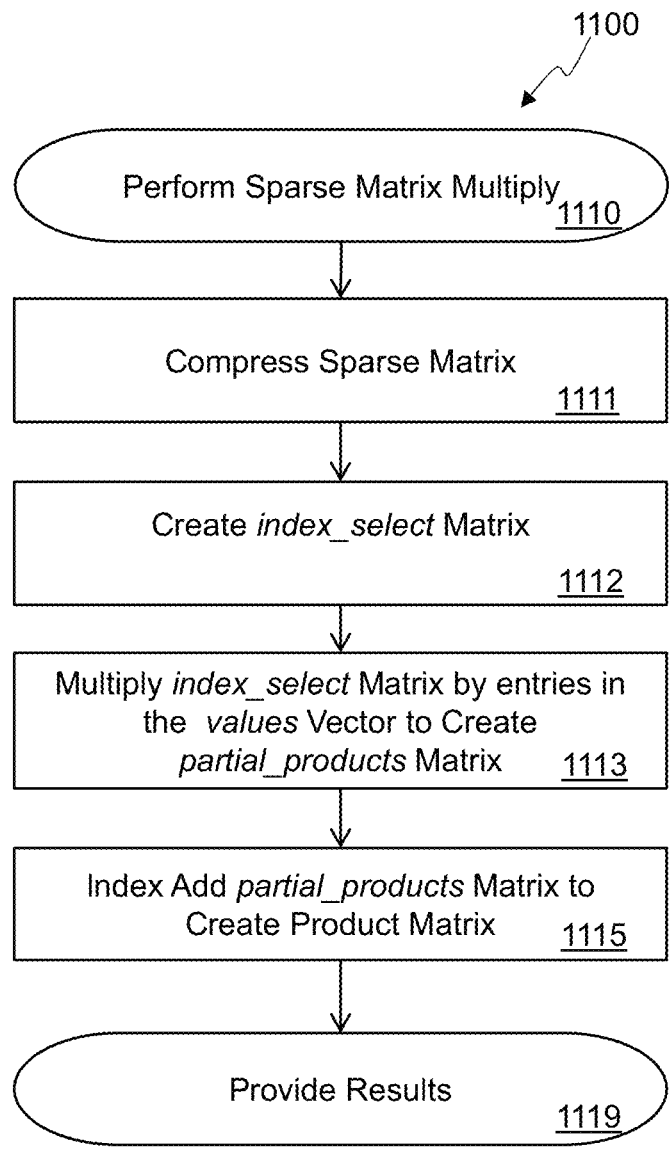
FIG. 11 is a flowchart of an embodiment of a method for performing a sparse matrix multiply.

FIG. 11 is a flowchart 1100 of an embodiment of a method for performing 1110 a sparse matrix multiply. The method of the flowchart 1100 may in some embodiments include compressing 1111 a Sparse multiplier matrix from an array representation into a compressed representation such as a CSR format or a format having a col_indices vector that has of one entry for each non-zero value in the Sparse multiplier matrix that provides the column number of that non-zero entry, a values vector that provides the non-zero values of the Sparse multiplier matrix, and a nnzs_per_row vector that has one entry per row of the Sparse multiplier matrix that provides the number of non-zero entries in each row. Optionally, the nnzs_per_row vector may only include entries for rows of the Sparse multiplier matrix that have at least one non-zero value and a nz_row_num vector may be included that provides a row_index for each row of the Sparse multiplier matrix that has at least one non-zero entry. More detail on the compression of the Sparse multiplier matrix has already been provided, including lines 201-213 of the pseudocode 200 of FIG. 2A and lines 261-278 of the pseudocode 260 of FIG. 2C.

The method of the flowchart 1100 continues by creating 1112 the index_select matrix by using the col_indices vector and the Sparse multiplier matrix. The index_select matrix has one row for each non-zero entry in the Sparse multiplier matrix that is copied from the corresponding row of the multiplicand matrix using the col_indices vector. Once the index_select matrix has been created, it is multiplied 1113 using entries in the values vector to create the partial_products matrix which is then further processed with an index add 1115 to add rows of the partial_products matrix corresponding to non-zero values in the same row of the Sparse multiplier matrix. This creates the Product matrix which can be provided 1119 as the result of the sparse matrix multiply.

Note that in some embodiments, the index_select matrix may not be fully generated as an intermediate step. The proper row of the multiplicand matrix may be directly indexed using the col_indices vector at the time that the related entry in the values vector is multiplied by the entries of that row.

Thus, the method to perform a matrix multiply using electronic circuitry as shown in flowchart 1100 includes obtaining a multiplicand matrix, an index of columns for non-zero values of a multiplier matrix, a first list of non-zero values of the multiplier matrix, and a second list of a number of non-zero entries per row of the multiplier matrix, and selecting rows of the multiplicand matrix based on respective entries of the index of columns of the multiplier matrix. The selected rows of the multiplicand matrix are multiplied by respective non-zero values of the first list to create partial products and the partial products selectively accumulated based on the second list to generate a product matrix. The product matrix is provided as a result of the matrix multiply. In some embodiments, the method may include creating an intermediate matrix including the selected rows of the multiplicand matrix, the intermediate matrix including a row for each non-zero value in the first list, storing the intermediate matrix, and retrieving the intermediate matrix for use in said multiplying. Some embodiments may also or alternatively include obtaining a third list of rows of the multiplier matrix having a least one non-zero value, selectively generating rows of the product matrix included in the third list based on the first list and the selected rows of the multiplicand matrix and setting rows of the product matrix not included in the third list to have all zero values. If the multiplier matrix has not been previously compressed, the method may compress the multiplier matrix by obtaining the multiplier matrix, and generating the index of columns, the first list, and the second list based on the multiplier matrix. In at least one embodiment, the electronic circuitry used for the method may be built using one or more Coarse-Grained Reconfigurable Architecture Integrated Circuits (CGRA IC) and the method may include obtaining configuration data and configuring one or more configurable units of the CGRA IC to perform said selecting, said multiplying, and said selectively accumulating, based on the configuration data.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or micro-code. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments but should be defined only in accordance with the following claims and equivalents thereof.

We claim as follows:

1. A matrix multiply apparatus comprising:
    an array of configurable units coupled by an array level network, the array of configurable units including configurable memory units having one or more banks of scratchpad memory and configurable compute units having a multi-stage single-instruction multiple datapath (SIMD) computation pipeline;
    a first set of one or more configurable units of the array of configurable units, configured to store a multiplicand matrix, receive an index of columns for non-zero values of a multiplier matrix, and generate an intermediate matrix that has one row per entry in the index copied from a respective row of the multiplicand matrix based on a corresponding entry in the index; and
    a second set of configurable units of the array of configurable units, configured to:
        receive the intermediate matrix from the first set of configurable units over the array level network;
        obtain a first list of the non-zero values of the multiplier matrix and a second list of a number of non-zero entries per row of the multiplier matrix;
        generate a product matrix using a multi-stage SIMD computation pipeline in the second set of configurable units by multiplying the non-zero values of the first list and elements of the intermediate matrix and accumulating results of the multiplies based on the second list; and
        provide the product matrix as a result of the matrix multiply.

2. The apparatus of claim 1, the first set of one or more configurable units further configured to generate the intermediate matrix as two or more submatrices including a first submatrix and a second matrix; and
    the second set of one or more configurable units further configured to:
    receive the first submatrix and generate a third submatrix to form a portion of the product matrix based on the first submatrix without the second submatrix; and
    receive the second submatrix and generate a fourth submatrix to form a portion of the product matrix based on the second submatrix without the first submatrix.

3. The apparatus of claim 2, the first set of one or more configurable units further configured to overwrite the first submatrix with the second matrix.

4. The apparatus of claim 1, the second set of one or more configurable units further configured to:
    generate a matrix of products by multiplying each element of the intermediate matrix by a non-zero value of the first list corresponding to a row of said element; and
    selectively add rows of the matrix of products based on the second list of the number of non-zero entries per row to generate the product matrix.

5. The apparatus of claim 1, the second set of one or more configurable units further configured to:
    obtain a third list of rows of the multiplier matrix having a least one non-zero value;
    selectively generate rows of the product matrix included in the third list based on the first list and the intermediate matrix; and
    set rows of the product matrix not included in the third list to have all zero values.

6. The apparatus of claim 1, further comprising a third set of one or more configurable units, coupled to the first set of one or more configurable units and the second set one or more of configurable units, and configured to:
    obtain the multiplier matrix;
    generate the index of columns, the first list, and the second list based on the multiplier matrix;
    provide the index of columns to the first set of one or more configurable units; and provide the first list and the second list to the second set of one or more configurable units.

7. The apparatus of claim 1, further comprising a network communicatively coupling the first set of one or more configurable units to the second set of one or more configurable units, the network including at least one switch and a plurality of links, a link in the plurality of links comprising a communication path capable of simultaneous transfer of a plurality of elements of the intermediate matrix.

8. The apparatus of claim 1, the multi-stage SIMD computation pipeline configured to simultaneously multiply a plurality of elements of a row of the intermediate matrix by a non-zero value of the first list.

9. The apparatus of claim 1, further comprising one or more configuration stores configured to:
receive configuration data; and
configure the first set of one or more configurable units and the second set of one or more configurable units based on the configuration data.

10. The apparatus of claim 1, wherein the second set of one or more configurable units includes a first configurable compute unit, a second configurable memory unit, and a third configurable unit;
the first configurable compute unit with a multi-stage SIMD computation pipeline and having:
a first configuration, controlled by first configuration data, that simultaneously multiplies a first plurality of elements of the intermediate matrix by a first non-zero value of the first list using the multi-stage SIMD computation pipeline and stores a first intermediate result in a scratchpad memory of the second configurable memory unit; and
a second configuration, controlled by second configuration data, that retrieves the first intermediate result from the second configurable memory unit, simultaneously multiplies a second plurality of elements of the intermediate matrix by a second non-zero value of the first list and adds the first intermediate result to generate a second intermediate result, and stores the second intermediate result in the scratchpad memory of the second configurable memory unit; and
the third configurable unit is configured to control which of the first configuration data and the second configuration data is enabled for the first configurable compute unit.

11. The apparatus of claim 1, further comprising a network of switches and links to communicatively couple the array of configurable units, including the first set of one or more configurable units and the second set of one or more configurable units.

12. The apparatus of claim 11, a link in the network of switches and links comprising a communication path capable of simultaneous transfer of a plurality of elements of the intermediate matrix.

13. The apparatus of claim 11, further comprising a third set of one or more configurable units configured to:
receive the intermediate matrix from the first set of one or more configurable units through the network;
store the intermediate matrix in the third set of one or more configurable units; and
provide the intermediate matrix to the second set of one or more configurable units through the network.

14. A method to perform a matrix multiply using an array of configurable units coupled by an array level network, the array of configurable units including configurable memory units having one or more banks of scratchpad memory and configurable compute units having a multi-stage single-instruction multiple datapath (SIMD) computation pipeline, the method comprising:
obtaining, at a first set of configurable units, a multiplicand matrix and an index of columns for non-zero values of a multiplier matrix;
selecting, by the first set of configurable units, rows of the multiplicand matrix based on respective entries of the index of columns of the multiplier matrix;
obtaining, at a second set of configurable units, a first list of non-zero values of the multiplier matrix, and a second list of a number of non-zero entries per row of the multiplier matrix;
multiplying, in the second set of configurable units, the selected rows of the multiplicand matrix by respective non-zero values of the first list to create partial products;
selectively accumulating the partial products in the second set of configurable units based on the second list to generate a product matrix; and
providing the product matrix as a result of the matrix multiply.

15. The method of claim 14, further comprising:
creating, by the first set of configurable units, an intermediate matrix including the selected rows of the multiplicand matrix, the intermediate matrix including a row for each non-zero value in the first list;
storing the intermediate matrix; and
retrieving the intermediate matrix for use in said multiplying.

16. The method of claim 14, further comprising:
obtaining a third list of rows of the multiplier matrix having a least one non-zero value;
selectively generating rows of the product matrix included in the third list based on the first list and the selected rows of the multiplicand matrix; and
setting rows of the product matrix not included in the third list to have all zero values.

17. The method of claim 14, further comprising
obtaining the multiplier matrix; and
generating the index of columns, the first list, and the second list based on the multiplier matrix.

18. The method of claim 14, the method further comprising:
obtaining configuration data; and
configuring one or more configurable units of one or more Coarse-Grained Reconfigurable Architecture Integrated Circuits (CGRA ICs) to perform said selecting, said multiplying, and said selectively accumulating, based on the configuration data;
wherein the one or more CGRA ICs include the first set of configurable units and the second set of configurable units.

19. A non-transitory machine-readable medium comprising one or more instructions that in response to being executed on a computing device cause the computing device to carry out a matrix multiply using an array of configurable units coupled by an array level network, the array of configurable units including configurable memory units having one or more banks of scratchpad memory and configurable compute units having a multi-stage single-instruction multiple datapath (SIMD) computation pipeline using a method comprising:
obtaining, at a first set of configurable units, a multiplicand matrix and an index of columns for non-zero values of a multiplier matrix;

selecting, by the first set of configurable units, rows of the multiplicand matrix based on respective entries of the index of columns of the multiplier matrix to create an intermediate matrix having one row per entry in said index;

obtaining, at a second set of configurable units, a first list of non-zero values of the multiplier matrix, and a second list of a number of non-zero entries per row of the multiplier matrix;

multiplying, in the second set of configurable units, the non-zero values of the first list and elements of the intermediate matrix to create partial products;

selectively accumulating the partial products in the second set of configurable units based on the second list to generate a product matrix; and providing the product matrix as a result of the matrix multiply.

20. The non-transitory machine-readable medium of claim 19, the method further comprising:

obtaining a third list of rows of the multiplier matrix having a least one non-zero value;

selectively generating rows of the product matrix included in the third list based on the first list and the intermediate matrix; and setting rows of the product matrix not included in the third list to have all zero values.

21. The non-transitory machine-readable medium of claim 19, the method further comprising:

obtaining the multiplier matrix; and generating the index of columns, the first list, and the second list based on the multiplier matrix.

22. The non-transitory machine-readable medium of claim 19, wherein the one or more instructions comprise configuration data for one or more configurable units of one or more Coarse-Grained Reconfigurable Architecture Integrated Circuits (CGRA IC).

23. The non-transitory machine-readable medium of claim 22, wherein the configuration data comprises first configuration data and second configuration data for a first configurable unit and third configuration data for a second configurable unit, the one or more configurable units of the CGRA IC including the first configurable unit, the second configurable unit, and a third configurable unit, and the second set of configurable units includes the first configurable unit, the second configurable unit, and the third configurable unit;

the first configuration data to configure the first configurable unit to simultaneously multiply a first plurality of elements of the intermediate matrix by a first non-zero value of the first list and store a first intermediate result of the multiplying in a scratchpad memory of the third configurable unit;

the second configuration data to configure the first configurable unit to retrieve the first intermediate result of the multiplying, simultaneously multiply a second plurality of elements of the intermediate matrix by a second non-zero value of the first list and accumulate the first intermediate result to generate a second intermediate result, and store the second intermediate result in the scratchpad memory of the second configurable unit; and the third configuration data to configure the second configurable unit to control which of the first configuration data and the second configuration data is enabled for the first configurable unit.

24. The non-transitory machine-readable medium of claim 22, wherein the configuration data comprises:

first configuration data to configure the first set of configurable units to obtain the multiplicand matrix and the index of columns and perform said selecting of the rows of the multiplicand matrix;

second configuration data to configure the first set of configurable units to receive the selected rows of the multiplicand matrix and store them in the second set of configurable units as the intermediate matrix;

third configuration data to configure the second set of configurable units to obtain the first list and second list and to receive the intermediate matrix from the second set of configurable units and to perform said multiplying and selective accumulating; and fourth configuration data to configure a third set of configurable units to receive data for the product matrix, store the product matrix in the third set of configurable units, and provide the product matrix on links of the CGRA IC;

wherein the one or more configurable units of the CGRA IC include the first set of configurable units, the second set of configurable units, and the third set of configurable units.

25. An apparatus to multiply a multiplicand matrix by a sparse multiplier matrix comprising:

a first scratchpad memory to store at least a portion of the multiplicand matrix;

address calculation circuitry configured to obtain an index of columns for non-zero values of the sparse multiplier matrix, calculate a location of a corresponding row of the multiplicand matrix in the first scratchpad memory for each entry of the index of columns to be a row of an intermediate matrix, and retrieve the rows of the intermediate matrix from the first scratchpad memory;

multiplication circuitry configured to obtain a first list of the non-zero values of the sparse multiplier matrix corresponding to the index of columns, and to multiply entries of the rows of the intermediate matrix by a corresponding entry in the first list to generate rows of partial products; and accumulation circuitry configured to obtain a second list of a number of non-zero entries per row of the sparse multiplier matrix and selectively add the rows of the partial products based on the second list to generate rows of a product matrix.

26. The apparatus of claim 25, further comprising:

a second scratchpad memory configured to store the intermediate matrix;

the multiplication circuitry further configured to receive the intermediate matrix from the second scratchpad memory for use in said multiplying.

27. The apparatus of claim 25, further comprising:

a third scratchpad memory to store the product matrix; and product matrix generation circuitry configured to:

obtain a third list of rows of the sparse multiplier matrix having a least one non-zero value;

store rows of the product matrix generated by the accumulation circuitry at a location in the third scratchpad memory based on the third list; and set rows of the product matrix not included in the third list to have all zero values.

28. The apparatus of claim 25, further comprising compression circuitry configured to:

obtain the sparse multiplier matrix; and generate the index of columns, the first list, and the second list based on the multiplier matrix.

29. The apparatus of claim 25, further comprising one or more Coarse-Grained Reconfigurable Architecture Integrated Circuits (CGRA ICs) with at least one configuration load/unload controller configured to:

obtain configuration data; and configure one or more configurable units of the one or more CGRA ICs to act as the first scratchpad memory, the address calculation circuitry, the multiplication circuitry, and the accumulation circuitry, based on the configuration data.

30. The apparatus of claim 25, further comprising a vector data path coupling the first scratchpad memory, the address calculation circuitry, and the multiplication circuitry, wherein the vector data path transfers multiple entries of the intermediate matrix simultaneously.

\* \* \* \* \*